US011115997B2

(12) United States Patent
Belghoul et al.

(10) Patent No.: US 11,115,997 B2
(45) Date of Patent: *Sep. 7, 2021

(54) METHOD AND APPARATUS FOR TIME DIVISION LTE TRANSMISSION IN UNLICENSED RADIO FREQUENCY BANDS

(71) Applicant: Apple Inc., Cupertino, CA (US)

(72) Inventors: Farouk Belghoul, Campbell, CA (US); Tarik Tabet, San Jose, CA (US); Syed A. Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,596

(22) Filed: Feb. 11, 2019

(65) Prior Publication Data

US 2019/0313432 A1 Oct. 10, 2019

Related U.S. Application Data

(63) Continuation of application No. 15/014,498, filed on Feb. 3, 2016, now Pat. No. 10,206,223.
(Continued)

(51) Int. Cl.
*H04W 72/12* (2009.01)
*H04W 76/15* (2018.01)
(Continued)

(52) U.S. Cl.
CPC ....... *H04W 72/1278* (2013.01); *H04L 1/1861* (2013.01); *H04L 1/1887* (2013.01);
(Continued)

(58) Field of Classification Search
CPC ............. H04W 72/1278; H04W 76/15; H04W 72/042; H04W 16/14; H04W 72/1284;
(Continued)

(56) References Cited

U.S. PATENT DOCUMENTS 9,433,018 B2   8/2016  Cai et al.
9,516,686 B2  12/2016  Barbieri et al.
(Continued)

FOREIGN PATENT DOCUMENTS

CN   102812772 A   12/2012
EP     3247163 A1   11/2017
(Continued)

OTHER PUBLICATIONS

ZTE "HARQ Related Issues for Licensed-Assisted Access Using LTE", 3GPP TSG RAN WGI Meeting #79 (R1-144829), Nov. 8, 2014 pp. 1-3.
(Continued)

*Primary Examiner* — Hassan Kizou
*Assistant Examiner* — Abdullahi Ahmed
(74) *Attorney, Agent, or Firm* — Dickinson Wright RLLP

(57) ABSTRACT

Apparatus and methods for time division based communication between a wireless device and a wireless network in a licensed radio frequency (RF) band and an unlicensed RF band are disclosed. The wireless device receives downlink control information (DCI), via a primary component carrier (PCC) of a primary cell (Pcell) in the licensed RF band, indicating downlink (DL) data transmission via a secondary component carrier (SCC) of a secondary cell (Scell) in the unlicensed RF band. The wireless device receives via the SCC part of the DL data transmission and transmits a control message via the PCC in response. The wireless device sends a scheduling request (SR) to the eNodeB and receives uplink (UL) transmission opportunities in a combination of the licensed RF band and the unlicensed RF band. The wireless device performs a clear channel assessment before reserving and transmitting to the eNodeB in the unlicensed RF band.

20 Claims, 22 Drawing Sheets

Related U.S. Application Data

(60) Provisional application No. 62/113,306, filed on Feb. 6, 2015.

(51) Int. Cl.
*H04L 1/18* (2006.01)
*H04L 5/00* (2006.01)
*H04L 27/00* (2006.01)
*H04L 5/14* (2006.01)
*H04W 72/04* (2009.01)
*H04W 16/14* (2009.01)
*H04W 84/12* (2009.01)

(52) U.S. Cl.
CPC ............ *H04L 5/001* (2013.01); *H04L 5/0053* (2013.01); *H04L 5/0055* (2013.01); *H04L 5/0092* (2013.01); *H04L 5/0098* (2013.01); *H04L 5/14* (2013.01); *H04L 27/0006* (2013.01); *H04W 72/042* (2013.01); *H04W 76/15* (2018.02); *H04L 1/1896* (2013.01); *H04W 16/14* (2013.01); *H04W 72/1284* (2013.01); *H04W 84/12* (2013.01)

(58) Field of Classification Search
CPC ........ H04W 84/12; H04L 5/0092; H04L 5/14; H04L 1/1887; H04L 1/1861; H04L 5/0098; H04L 5/001; H04L 5/0055; H04L 27/0006; H04L 5/0053; H04L 1/1896
See application file for complete search history.

(56) References Cited

U.S. PATENT DOCUMENTS

| | | | |
|---|---|---|---|
| 10,206,223 B2* | 2/2019 | Belghoul | H04L 1/1887 |
| 2010/0185910 A1* | 7/2010 | Lee | H04L 1/1887 |
| | | | 714/748 |
| 2012/0039275 A1 | 2/2012 | Chen et al. | |
| 2013/0028117 A1 | 1/2013 | Montojo et al. | |
| 2013/0028205 A1* | 1/2013 | Damnjanovic | H04L 5/001 |
| | | | 370/329 |
| 2013/0051355 A1 | 2/2013 | Hong | |
| 2013/0070700 A1 | 3/2013 | Chang | |
| 2014/0022967 A1* | 1/2014 | Yang | H04L 1/1861 |
| | | | 370/280 |
| 2014/0029561 A1 | 1/2014 | Kim et al. | |
| 2014/0050191 A1 | 2/2014 | Kim et al. | |
| 2014/0079008 A1 | 3/2014 | Park | |
| 2014/0161002 A1 | 6/2014 | Gauvreau et al. | |
| 2014/0362780 A1 | 12/2014 | Malladi et al. | |
| 2014/0376483 A1 | 12/2014 | Hong et al. | |
| 2015/0092715 A1 | 4/2015 | Seo et al. | |
| 2015/0098412 A1* | 4/2015 | Yerramalli | H04W 74/0808 |
| | | | 370/329 |
| 2015/0117368 A1* | 4/2015 | Barriac | H04W 72/02 |
| | | | 370/329 |
| 2015/0223075 A1* | 8/2015 | Bashar | H04W 16/14 |
| | | | 370/329 |
| 2015/0358995 A1* | 12/2015 | Li | H04L 5/0007 |
| | | | 370/329 |
| 2016/0073344 A1* | 3/2016 | Vutukuri | H04W 52/0216 |
| | | | 370/252 |
| 2016/0128070 A1* | 5/2016 | Hanusch | H04W 74/0808 |
| | | | 370/252 |
| 2016/0128102 A1* | 5/2016 | Jauh | H04W 74/0833 |
| | | | 370/329 |
| 2016/0142920 A1* | 5/2016 | Suzuki | H04W 16/14 |
| | | | 370/336 |
| 2017/0048880 A1* | 2/2017 | Anderson | H04W 72/1226 |
| 2019/0334590 A1* | 10/2019 | Son | H04B 7/0452 |

FOREIGN PATENT DOCUMENTS

| | | |
|---|---|---|
| JP | 2010531109 A | 9/2010 |
| JP | 2014500685 A | 1/2014 |
| JP | 2015506604 A | 3/2015 |
| JP | 2016524421 A | 8/2016 |
| WO | 2009002296 A1 | 12/2008 |
| WO | 2012078565 A1 | 6/2012 |
| WO | 2013096563 A1 | 6/2013 |
| WO | 2014200951 A2 | 12/2014 |

OTHER PUBLICATIONS

CMCC "Discussion on Possible Solutions for LAA", 3GPP TSG RAN WGl Meeting #79 (R1-144940), Nov. 8, 2014 pp. 1-6.
International Patent Application No. PCT/US2016/016418—International Search Report and Written Opinion dated Jun. 29, 2016.
"Qualcomm Research LTE in Unlicensed Spectrum: Harmonious Coexistence with Wi-Fi," Qualcomm Technologies, Inc., Jun. 2014, 19 pages.
Australian Patent Application No. 2016215287—Full Examination Report No. 1 dated Feb. 23, 2018.
European Patent Application No. 16747216.6—Extended European Search Report dated Aug. 8, 2018.
3GPP TSG RAN WG1 #80, Discussion on UL transmission for LAA, R1-150368, Samsung, Athens, Greece, Feb. 9-13, 2015, 7 pages.
3GPP TSG RAN WG1 Meeting #80, On the LAA uplink: scheduling, LBT, and HARQ, R1-150507, Intel Corporation, Athens, Greece, Feb. 9-13, 2015, 4 pages.
Japanese Patent Application No. 2017-535765—First Office Action dated Sep. 7, 2018.
Huawei, HiSilicon, Deployment scenarios and evaluation methodology for LAA-LTE[online], 3GPP TSG-RAN WG1#78b R1-143727, Internet<URL:http://www.3gpp.org/ftp/tsg_ran/WG1_RL1/TSGR1_78b/Docs/R1-143727.zip> (Sep. 27, 2014), 11 pages.
Korean Patent Application No. 10-2017-7021783—Non-Final Office Action dated Nov. 20, 2018.
Microsoft Corporation, "Discussion on required functionalities for licensed-assisted access using LTE," 3GPP TSG RAN WG1 #80, R1-150630, Feb. 9-13, 2015, 4 pages.
NTT DOCOMO et al., "Discussion on CA beyond 5CCs," 3GPP TSG RAN WG2 #89, R2-150113, Feb. 9-13, 2015, 6 page.
Japanese Patent Application No. 2017-535765—Final Office Action dated Mar. 12, 2019.
Samsung, Carrier aggregation with LAA Scell[online], 3GPP TSG-RAN WG2#89 R2-150415, Internet<URL:http://www.3gpp.org/ftp/tsg_ran/WG2_RL2/TSGR2_89/Docs/R2-150415.zip>, Jan. 31, 2015, 3 pages.
Korean Patent Application No. 10-2017-7021783—Notice of Preliminary Rejection dated May 30, 2019.
Chinese Patent Application No. 201680008516.8—First Office Action dated Sep. 24, 2019.

* cited by examiner

370

| UL/DL Configuration | DL-to-UL Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D = Downlink Subframe
S = Special Subframe
U = Uplink Subframe

*FIG. 3G*

METHOD AND APPARATUS FOR TIME DIVISION LTE TRANSMISSION IN UNLICENSED RADIO FREQUENCY BANDS

CROSS-REFERENCE TO RELATED APPLICATIONS

This Application is a continuation of U.S. patent application Ser. No. 15/014,498, entitled "METHOD AND APPARATUS FOR TIME DIVISION LTE TRANSMISSION IN UNLICENSED RADIO FREQUENCY BAND," filed Feb. 3, 2016, issued as U.S. Pat. No. 10,206,223 on Feb. 12, 2019, which claims the benefit of U.S. Provisional Application No. 62/113,306, entitled "METHOD AND APPARATUS FOR TIME DIVISION LTE TRANSMISSION IN UNLICENSED RADIO FREQUENCY BANDS", filed Feb. 6, 2015, the contents of which are incorporated herein by reference in their entirety for all purposes.

FIELD

The described embodiments generally relate to wireless communications, and more particularly, to methods and apparatus for time division Long Term Evolution (LTE) transmission for mobile wireless devices operating using combinations of licensed and unlicensed radio frequency bands.

BACKGROUND

Fourth generation (4G) cellular networks employing newer radio access technology systems that implement the $3^{rd}$ Generation Partnership Project (3GPP) Long Term Evolution (LTE) and LTE Advanced (LTE-A) communication protocols are rapidly being developed and deployed within the United States and abroad. The LTE-A communication protocol includes modes for aggregation of multiple component carriers (CCs) to provide for meeting the bandwidth requirements of multi-carrier systems that cumulatively achieve data rates not possible by predecessor LTE versions. Wireless communication devices can include configurable radio frequency (RF) circuitry that can transmit and/or receive radio frequency communications using multiple component carriers in a single radio frequency band and/or in multiple radio frequency bands. With wireless networks encountering exponential growth of Internet traffic, such as video traffic, web browsing traffic, and other data traffic that can be carried over the Internet, development of new wireless communication protocols that can support wider bandwidths, a greater range of radio frequencies, and higher throughput data rates arises. Given the costs and/or data traffic limits to communicate over cellular wireless networks, users can prefer to communicate over "free" wireless local area networks (WLANs), subscription based WLANs, and/or operator provided WLANs when possible. Cellular wireless communication devices do not presently operate using unlicensed radio frequency bands in which WLANs typically operate, but standardization efforts and exploration have begun that plan to add bandwidth for cellular transmissions by using radio frequency channels within the unlicensed radio frequency bands presently occupied by WLANs. In particular, of the unlicensed radio frequency spectrum, the 5 GHz radio frequency band is targeted to provide for secondary carrier LTE transmission by cellular wireless communication devices when operating in a carrier aggregation mode. Other radio frequency bands of the unlicensed radio frequency spectrum are also under consideration for use as part of LTE wireless communication protocols that provide for cellular wireless communication devices to operate in an LTE Unlicensed (LTE-U) mode.

As such, there exists a need for solutions that provide methods and apparatuses for managing radio frequency communication to and from mobile wireless devices when operating in licensed radio frequency bands, unlicensed radio frequency bands, and in combinations of both licensed and unlicensed radio frequency bands. In this regard, it would be beneficial to manage Time Division Duplex (TDD) LTE communication by network equipment and wireless communication devices that use carrier aggregation to include capabilities for communication in unlicensed radio frequency bands in addition to licensed radio frequency bands.

SUMMARY

Apparatus and methods for managing uplink and downlink transmissions of mobile wireless devices operating using a combination of radio frequency channels in both licensed and unlicensed radio frequency bands are described. Wireless cellular network equipment, e.g., base stations (also referred to as enhanced NodeBs or eNodeBs) alone or in combination with additional wireless network equipment, can manage the use of secondary component carriers associated with secondary cells by one or more wireless communication devices that employ carrier aggregation to transmit and/or receive using multiple radio frequency carriers in parallel. One or more of the secondary component carriers can be centered at radio frequencies in an unlicensed radio frequency band, e.g., the 5 GHz Industrial, Medical, and Scientific (ISM) band, while a primary component carrier for a primary cell can operate in a licensed cellular radio frequency band. The network equipment schedules data communication between a cellular wireless network and a wireless communication device using carrier aggregation of a primary component carrier, e.g., as specified in LTE/LTE-A wireless communication protocols, and supplements the data communication with additional bandwidth in the unlicensed radio frequency band over one or more secondary component carriers. A wireless communication device configured to communicate using carrier aggregation with component carriers in a combination of licensed and unlicensed radio frequency bands can be referred to herein as an LTE-Unlicensed (LTE-U) capable wireless communication device. The primary and secondary component carriers belong to primary and secondary cells respectively and are managed through a common eNodeB (base station). The unlicensed radio frequency band is shared with other wireless devices that operate in the same unlicensed radio frequency band, e.g., wireless local area network (WLAN) devices that use a Wi-Fi wireless communication protocol.

Both the network equipment, e.g., the eNodeBs, and the wireless communication device are configured to monitor portions of the unlicensed radio frequency band), e.g., for a time period of at least twenty micro-seconds or thirty-four micro seconds, to determine whether a radio frequency channel is "clear" or "not in use" by other wireless equipment, before transmitting using a secondary component carrier. Both the network equipment and the wireless communication device generate a signal, e.g., a "preamble", after determining that a secondary component carrier is "clear" for communication and before transmission of the data and/or control signals that use the secondary component carrier. The network equipment and the wireless communication device can "reserve" the secondary component carrier using the preamble signal to indicate a forthcoming transmission on the secondary component carrier in the unlicensed radio frequency band. The network equipment and the wireless communication device can use a back-off mechanism after each clear channel assessment when detecting energy at or above a particular power level for at least a period of time, e.g., at or above −72 dB or −83 dB for at least twenty or thirty-four micro-seconds, to ensure fair access to the unlicensed radio frequency band to any wireless communication devices that seek to use it. In some embodiments, the back-off mechanism includes an exponentially increasing back off time period after each clear channel assessment. The network equipment can use a signaling channel on the primary component carrier, e.g., a physical downlink control channel (PDCCH), to schedule grant assignments for communication in both the primary cell (i.e., on the primary component carrier) and in secondary cells, (i.e., on secondary component carriers). Downlink and uplink grant assignments are communicated using the primary component carrier in the licensed radio frequency band, thereby avoiding interference for these control signals in the unlicensed radio frequency band. The network equipment configures the wireless communication device with multiple uplink transmission opportunities using an "enhanced" grant mechanism communicated over the primary component carrier of the primary cell. The multiple uplink transmission opportunities permit the wireless communication device several different resource slots in which to complete the uplink transmission and thereby permit repeated attempts to access the unlicensed radio frequency band. When initial clear channel assessment for a first resource slot indicates that the unlicensed radio frequency band is occupied, the wireless communication device can re-assess the availability of the unlicensed radio frequency band using additional resource slots provided by the enhanced grant mechanism. The wireless communication device uses a signaling channel on the primary component carrier, e.g., a physical uplink control channel (PUCCH), to communicate acknowledgement (ACK) and negative ACK (NACK) control messages to the network equipment in response to downlink data transmissions received by the wireless communication device. The network equipment can send hybrid automatic repeat request (HARQ) ACK and NACK messages to the wireless communication device for uplink transmissions received on the primary component carrier of the primary cell and/or on one or more secondary component carriers of secondary cells using the physical HARQ indicator channel (PHICH) on the primary component carrier of the primary cell. Thus, all ACK/NACK in both downlink and uplink directions for both primary and secondary component carriers are transmitted on the primary component carrier. In some embodiments, the network equipment and/or the wireless communication device can limit transmissions in the unlicensed radio frequency band to a maximum transmission time period, e.g., for a continuous time period of at most four milliseconds or five milliseconds or another fixed maximum time period to comply with regulatory constraints in one or more jurisdictions.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIG. 3G illustrates a set of LTE TDD UL/DL subframe configurations that include associated sequences of uplink subframes, downlink subframes, and special subframes for an LTE TDD wireless communication network, in accordance with some embodiments.

DETAILED DESCRIPTION

Figure 1:
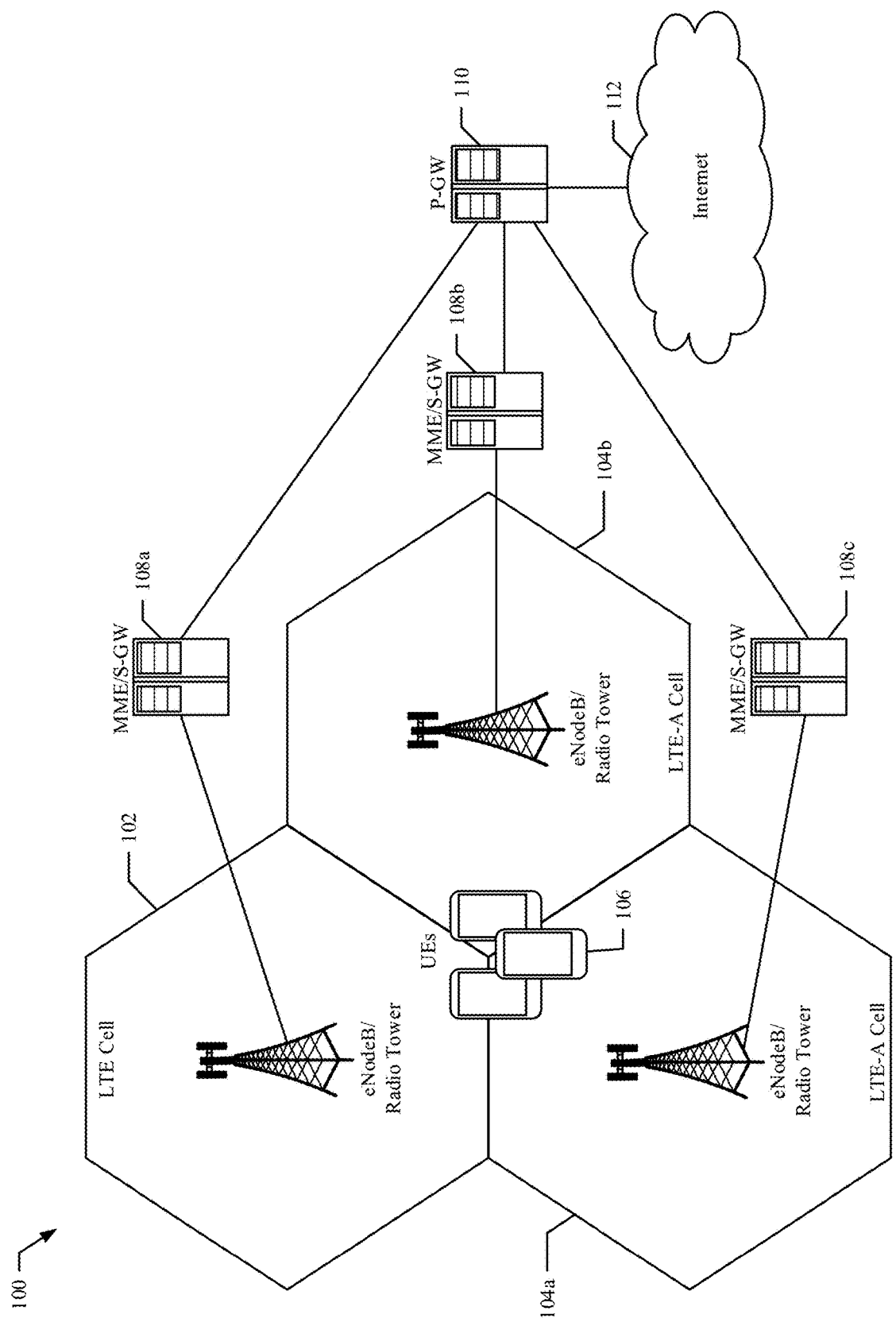
FIG. 1 illustrates a wireless communication network including Long Term Evolution (LTE) and LTE Advanced (LTE-A) network cells supporting multiple user equipment devices (UEs), in accordance with some embodiments.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

In various embodiments, these capabilities may allow a respective UE to communicate within various 4G network cells that can employ any type of LTE-based radio access technology (RAT) supporting carrier aggregation. In some embodiments, the respective UE may communicate using an LTE-based RAT and/or in accordance with a wireless communication protocol for a wireless local area network (WLAN). In some embodiments, the UE may operate using LTE wireless communication protocols in licensed radio frequency bands and/or in a combination of licensed and unlicensed radio frequency bands. In some embodiments, the UE may offload all or a portion of data communication between a cellular connection of an LTE-based wireless network and a connection via a WLAN. In some embodiments, the UE may offload portions of data between component carriers of a carrier aggregation scheme. In some embodiments, the component carriers can be in a combination of licensed and unlicensed radio frequency bands. In some embodiments, a wireless network provider can manage offloading of data communication between networks using different RATs, including some that operate in accordance with different wireless communication protocols. In some embodiments, the UE can transfer a connection, e.g., via reselection, between an LTE-based wireless network and a WLAN.

In some embodiments, the UE can communicate using multiple component carriers in accordance with carrier aggregation as specified by an LTE-A wireless communication protocol. Wireless communication devices that communicate in accordance with 3GPP LTE and/or LTE-A wireless communication protocols can use carrier aggregation to provide for increased throughput, e.g., in a downlink direction from multiple cells of a wireless network. A primary component carrier, which can be associated with a first cell (primary cell) of the wireless network, can be used for a combination of downlink communication from the wireless network to the wireless communication device and uplink communication from the wireless communication device to the wireless network. In some embodiments, communication on the primary component carrier can be in accordance with a time division duplex (TDD) LTE-A wireless communication protocol. A secondary component carrier, which can be associated with a second cell (secondary cell) of the wireless network, can also be used for downlink communication or a combination of both downlink and uplink communication, in some embodiments. The aggregate data rate achievable through carrier aggregation using multiple component carriers can surpass data rates achievable by using only a single component carrier. Uplink communication, however, in some embodiments, can be constrained to use only the primary component carrier; while in other embodiments, secondary component carriers can be used not only for downlink communication also be used for uplink communication. Extensions to LTE/LTE-A wireless communication protocols can provide for using combinations of a primary component carrier in a licensed radio frequency band and one or more secondary component carriers in unlicensed radio frequency bands, as described further herein.

Each component carrier used in carrier aggregation can be centered at different radio frequency values within a common radio frequency band or across two separate radio frequency bands. The separate radio frequency bands can include licensed radio frequency bands or a combination of both licensed and unlicensed radio frequency bands. In some embodiments, communication via a primary component carrier used for carrier aggregation can be within a licensed radio frequency band and communication via a secondary component carrier used for carrier aggregation by the UE can be within an unlicensed radio frequency band. A wireless network provider, via wireless network equipment, can manage the use of secondary component carriers for carrier aggregation in unlicensed radio frequency bands in a manner to mitigate coexistence interference with other wireless communication devices sharing the unlicensed radio frequency bands. The wireless network provider can use one or more performance metrics collected by UEs and/or by access network equipment, e.g., eNodeBs, which monitor radio frequency conditions, signal quality, data communication performance, link stability, or the like, to determine whether, when, and/or how to offload data communication between parallel wireless networks, to share data communication using multiple component carriers via carrier aggregation, and/or to reselect between different wireless networks that use different RATs, including WLANs.

A downlink control channel, e.g., the physical downlink control channel (PDCCH), can be used to communicate information from access network equipment, eNodeBs, to UEs to indicate scheduled downlink transmissions and uplink transmission opportunities (grants). The PDCCH can be communicated using the primary component carrier (PCC) of the primary cell (Pcell) and can assign downlink resources and uplink resources for both the PCC and for secondary component carriers (SCCs) of one or more secondary cells (Scells). In some embodiments, use of the PCC to carry SCC resource information can be referred to as "cross scheduling". An uplink control channel, e.g., the physical uplink control channel (PUCCH), can be used to communicate signaling messages from a UE to an eNodeB using the PCC of the Pcell. In some embodiments, the PCC can be within a licensed radio frequency spectrum while one or more SCCs can be within an unlicensed radio frequency spectrum. Scheduling for communication on the SCCs in the unlicensed spectrum can continue to be carried by the PCC in the licensed spectrum. As the unlicensed spectrum can be shared by multiple wireless communication devices that operate in accordance with different wireless communication protocols, both wireless access equipment, e.g., one or more eNodeBs, that use the unlicensed spectrum for SCC communication in a carrier aggregation mode, and wireless communication devices, e.g., one or more UEs, that also use SCCs in the unlicensed spectrum can manage their communication to coexist with other wireless communication devices that share the unlicensed spectrum, e.g., to provide "fairness" for access to the unlicensed spectrum to the multiple different wireless communications devices that share the unlicensed spectrum. As described further herein, methods and apparatuses to allow TDD LTE communication to use unlicensed spectrum for uplink and/downlink transmissions and to coexist with other wireless communication devices that use the unlicensed spectrum. In some embodiments, the other wireless communication devices operate in the unlicensed spectrum in accordance with a wireless local area network (WLAN) communication protocol, such as a Wi-Fi communication protocol, and/or using an LTE-Unlicensed (LTE-U) wireless communication protocol.

In some embodiments, a UE and wireless access network equipment, e.g., one or more eNodeBs, can operate in accordance with a TDD LTE wireless communication protocol that provides carrier aggregation of multiple component carriers, using a PCC associated with a Pcell and at least one SCC associated with an Scell, where the PCC operates in a licensed radio frequency band, (e.g., in compliance with a 3GPP LTE/LTE-A wireless communication protocol), and the SCC operates in an unlicensed radio frequency band, (e.g., in accordance with a 3GPP LTE-U wireless communication protocol). Both the wireless access network equipment and the UE can support a "listen before talk" mechanism by which the wireless access network equipment and the UE can "listen" to at least a portion of the unlicensed radio frequency band, e.g., associated with one or more SCCs, to determine whether the portion of the unlicensed radio frequency band is occupied by another wireless access network equipment and/or another UE. (Listening can also be referred to as carrier sensing and/or medium sensing, in some embodiments.) The wireless access network equipment and/or the UE can listen for at least a fixed period of time, e.g., at least 20 or 34 micro-seconds, before transmitting using the unlicensed radio frequency band. The wireless access network equipment and/or the UE can listen for signal energy that equals or exceeds a power level, e.g., at or above −72 or −83 dB, for at least the fixed period of time to determine whether a portion of the unlicensed radio frequency band is occupied. In some embodiments, transmission by the wireless access network equipment and/or the UE can be "frame aligned" to communication in the licensed radio frequency band, e.g., the "listen" period can occur at the start of a time period such as a first time slot of a subframe. In some embodiments, the wireless access network equipment and/or the UE can generate and transmit a "preamble" signal before transmission of data in the unlicensed radio frequency band, the "preamble" signal providing an indication to other wireless communication devices, which share the unlicensed radio frequency band and "listen" before communicating, that the wireless network equipment and/or the UE intend to transmit in the unlicensed radio frequency band. In some embodiments, the wireless access network equipment and the UE can support a back-off mechanism, e.g. delaying a next attempt to transmit by an exponentially increasing back-off time period, when determining that the unlicensed radio frequency band is occupied. The back-off mechanism can permit "fair" access to the unlicensed radio frequency band to multiple wireless communication devices.

To communicate downlink (DL) and uplink (UL) resource grant assignments to the UE, the wireless access network equipment can use the PDCCH on the primary component carrier of the Pcell to schedule transmissions (in the DL direction) to the UE on the PCC that uses the licensed radio frequency band and on one or more SCCs that use the unlicensed radio frequency band. The wireless network equipment can also use the PDCCH on the PCC of the Pcell to grant resource assignments for UL transmissions by the UE on the PCC that uses the licensed radio frequency band or on one or more SCCs that use the unlicensed radio frequency band. The wireless access network equipment can schedule transmissions in the unlicensed radio frequency band for itself and for multiple UEs that operate in accordance with an LTE-U wireless communication protocol using a control channel of the licensed radio frequency band. Thus, control signaling information for the unlicensed radio frequency band, which can be subject to interference from multiple wireless communication devices that share the unlicensed radio frequency band, can be communicated between the wireless access network equipment and the UEs in a "robust" and "scheduled" licensed radio frequency band, thereby minimizing interference. In some embodiments, the wireless access network equipment can schedule a particular UE with multiple UL transmission opportunities using an "enhanced" grant mechanism communicated on the PCC of the Pcell. The multiple UL transmission opportunities for the UE can provide multiple distinct time periods in which the UE can attempt to communicate with the wireless access network equipment, thereby permitting multiple chances for the UE to successfully communicate while also using a "listen before talk" mechanism to avoid interference and offer fair access to other wireless communication devices that share the unlicensed radio frequency band. In some embodiments, the UE communicates acknowledgement (ACK) and negative ACK (NACK) messages for Scell DL data transmissions on an UL signaling channel, e.g., the PUCCH, which uses the PCC of the Pcell. In some embodiments, the wireless access network equipment communicates hybrid automatic repeat request (HARQ) ACK and NACK messages on a DL signaling channel, e.g., the physical HARQ indicator channel (PHICH), which uses the PCC of the Pcell, in response to UL data transmissions that use the Pcell or the Scell from the UE. In some embodiments, the wireless access network equipment and/or the UE can transmit in the unlicensed radio frequency spectrum continuously for no more than a fixed period of time, e.g., for a maximum of four milliseconds (corresponding to four consecutive subframes) or five milliseconds (corresponding to five consecutive subframes), e.g., to comply with local jurisdiction regulations for communication in an unlicensed radio frequency band.

Additionally, it should be understood that the UEs described herein may be configured as multi-mode wireless communication devices that are also capable of communicating via additional third generation (3G) and/or second generation (2G) RATs. In these scenarios, a multi-mode UE can be configured to "prefer" attachment to LTE or LTE-A networks offering faster data rate throughput, as compared to legacy 3G networks offering lower data rate throughputs. For instance, in some implementations, a 4G compliant UE may be configured to fall back to a legacy 3G network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 depicts a wireless communication system 100, which can comply with a 3GPP Evolved Universal Terrestrial Radio Access (E-UTRA) air interface, and can include, but is not limited to including, an LTE network cell 102 and two LTE-A network cells 104a-b, respectively having enhanced NodeB (eNodeB) base stations (e.g., depicted as radio towers) that can communicate between and amongst each other via an LTE-X2 interface. Further, the E-UTRA compliant communication system 100 can include any number of mobility management entities (MMES) 108a-c, serving gateways (S-GWs) 108a-c, PDN gateways (P-GWs) 110, etc., which, as part of an evolved packet core (EPC), can communicate with any of the LTE network cell 102 eNodes and/or LTE-A cell 104a-b eNodeBs, via an LTE-S1 interface. Additionally, the E-UTRA communication system 100 can include any number of UEs 106 that can receive wireless communications service via one or more of the eNodeBs of the LTE network cells 102 and/or LTE-A network cells 104a-b, at any particular time. By way of example, a UE 106 may be located within one or more LTE-A network cell(s) 104a-b. While not explicitly illustrated in FIG. 1, LTE network cells 102 and LTE-A network cells 104a-b can overlap at least partially in geographic area covered by each cell.

In various embodiments, any of the MMEs 108a-c and/or any of the eNodeB base stations of the LTE-A network cells 104a-b, which are capable of supporting carrier aggregation, can be configured to communicate control-plane data to any of the UEs 106 in the DL; Alternatively, any of the UEs 106 may be capable of communicating control-plane data via any of the LTE-A network cells 104a-b in the UL. In this regard, it should be understood that the MMEs 108a-b can perform Non-Access Stratum (NAS) control-plane signaling between the EPC and the UE 106 via the eNodeB over the radio access network (RAN) portion of the network. In some scenarios, NAS signaling can include, but is not limited to including, procedures for establishing and releasing radio bearer connections for user equipment (UE), affecting UE transitions from idle mode to connected mode (and vice versa) by generating corresponding paging messages, and implementing various communication security features.

Further, the eNodeB base stations of the LTE-A cells 104a-b can be configured to perform various radio resource control (RRC) control-plane signaling procedures, including, but not limited to including, system information broadcasting, transmitting paging messages emanating from MMEs, RRC parameter configuration for UEs, network cell selection and reselection procedures, measurement and reporting configuration for UEs, monitoring and reporting of radio link signal quality, and management of radio connections between various UE and a wireless network including adding, deleting, and transitioning between the use of different radio bearers, including component carriers used for carrier aggregation, etc. In various implementations, RRC control plane signaling may be performed in conjunction with one or more of the following LTE protocol entities or layers: the packet data convergence protocol (PDCP), the radio link control (RLC) layer, the medium access control (MAC) layer, and the physical (PHY) layer. It should be understood that control-plane data and user-plane data can be multiplexed within the MAC layer and communicated to an intended recipient via the PHY layer, in the downlink (DL) or in the uplink (UL), e.g., during the same transmission time interval (TTI).

Figure 2A:
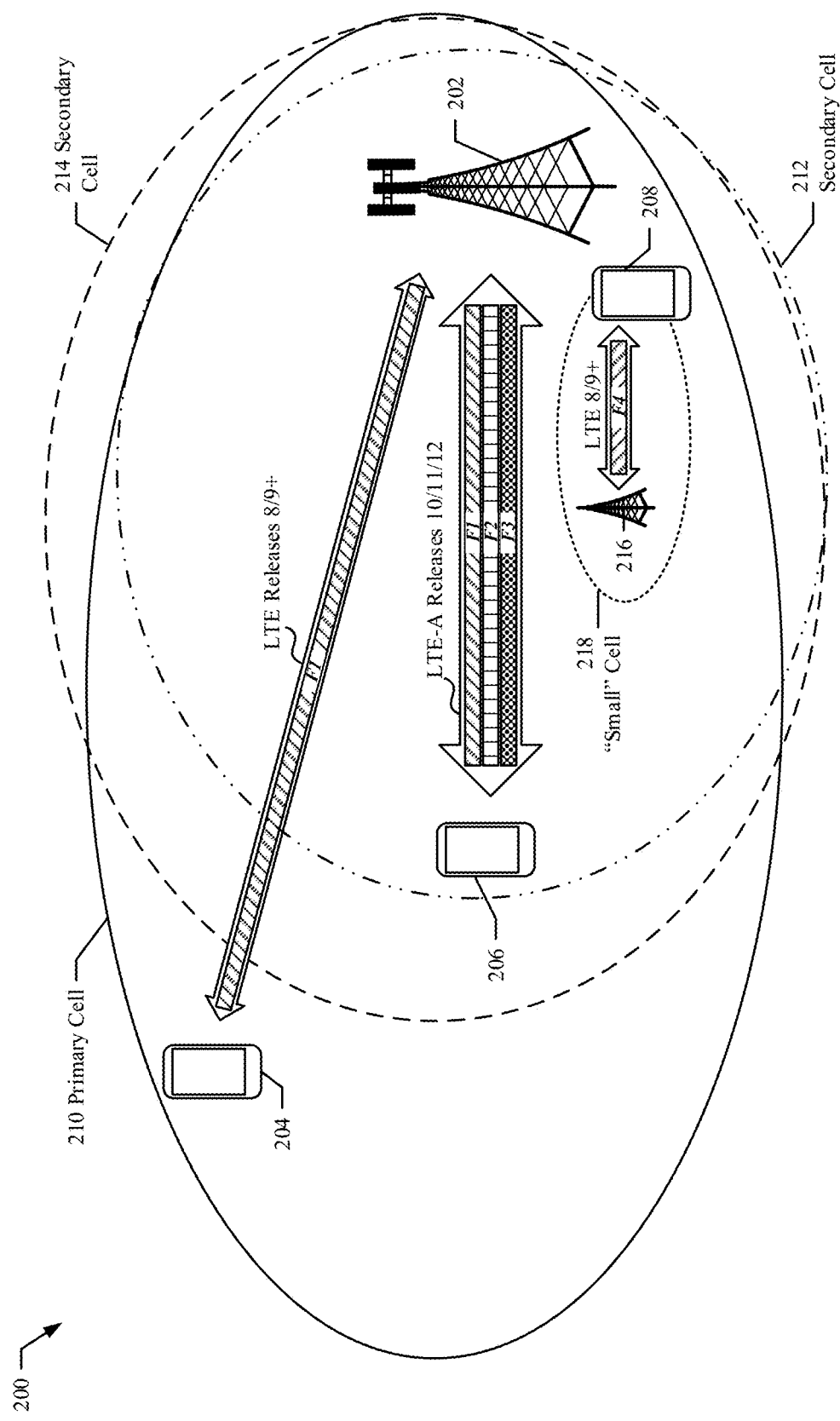
FIGS. 2A and 2B illustrate a wireless communication network diagram depicting LTE and LTE-A user equipment (UE) in communication with a primary carrier cell and with one or more secondary carrier cells, in accordance with various implementations of the disclosure.

FIG. 2A illustrates a wireless communication network diagram 200 depicting an LTE-A compliant UE 206 that is in communication with a primary cell 210 and with two secondary cells 212 and 214, each cell overlapping but not necessarily covering the same geographic area, in a carrier aggregation scenario. By way of example, and with reference to 3GPP LTE-A Releases 10, 11, and 12, the LTE-A compliant UE 206 can communicate with the eNodeB (base station) 202 (e.g., in the DL or the UL), which can have radio frequency transmission and reception equipment for providing radio coverage via three distinct radio frequency resources (also referred to as carriers), F1, F2, and F3. The three carriers can be used as individual component carriers (CCs) for communication that can be provided to the LTE-A compliant UE 206 in aggregate, e.g., to offer higher communication bandwidth and/or throughput than can be possible using only a single component carrier. From the perspective of the LTE-A compliant UE 206, the CC radio frequency resource F1 can be associated with the primary cell 210, the CC radio frequency resource F2 can be associated with the secondary cell 212, and the CC radio frequency resource F3 can be associated with the secondary cell 214. Alternative carrier aggregation representations for a frequency resource scenario are described further herein for FIGS. 3A, 3B and 3C.

The wireless communication network diagram 200 also depicts an LTE compliant UE 204, with reference to 3GPP LTE Releases 8 and 9, which is not capable of communicating using carrier aggregation with multiple component carriers but can communicate in accordance with an LTE wireless communication protocol using one component carrier, e.g., the primary component carrier. By way of example, the LTE compliant UE 204 can communicate with the eNodeB (base station) 202 (in the DL or the UL) via a single frequency resource F1. In the single carrier scenario, the LTE compliant UE 204 employs individual standard-designated system bandwidths that limit achievable data rate throughput to roughly 300 Mbits/sec. in the DL, and roughly 75 Mbits/sec. in the UL (real world implementations may vary) using a frequency bandwidth that can range from 1.4 MHz up to 20 MHz. The wireless communication network diagram 200 also depicts an LTE compliant UE 208, which operates in accordance with an LTE wireless communication protocol (e.g., 3GPP LTE Releases 8/9 or later) and can connect to a wireless network via a single frequency resource F4, which can be associated with a "small" cell 218, i.e., a cell having a geographic coverage range that is less than that of a usual "macro" cell for a wireless network. In some embodiments, the "small" cell 218 can be also referred to as a micro-cell, nano-cell, or femto-cell, which can provide limited coverage that supplements coverage provided by a macro cell, e.g., by the primary cell 210, of a cellular wireless network. The "small" cell 218 can emanate from dedicated network equipment 216, which can be connected to the wireless network via a "back haul" using either a wired or wireless connection. In some embodiments, the "small" cell 218 connects to the wireless network via a wired connection (e.g., through a "broadband" link). A wireless network provider can offer services for a "home" based "small cell" that provides short range coverage within a limited area to supplement service provided by one or more macro cells of the cellular wireless network. Wireless network providers can seek to use multiple parallel connection options in order to balance network loading and provide for greater coverage, higher data rates, and/or greater link stability using a combination of "macro" cells and "small" cells. In some embodiments, a wireless network provider can operate the "small" cell 218 using a carrier in a licensed radio frequency band, e.g., via frequency resource F4. In some embodiments, the wireless network provider can operate the "small" cell 218 using a secondary component carrier in an unlicensed radio frequency band to supplement communication via a primary component carrier in a licensed radio frequency band. An LTE-U capable wireless communication device would be able to connect to the wireless network using a combination of component carriers in both licensed and unlicensed radio frequency bands via carrier aggregation.

Figure 2B:
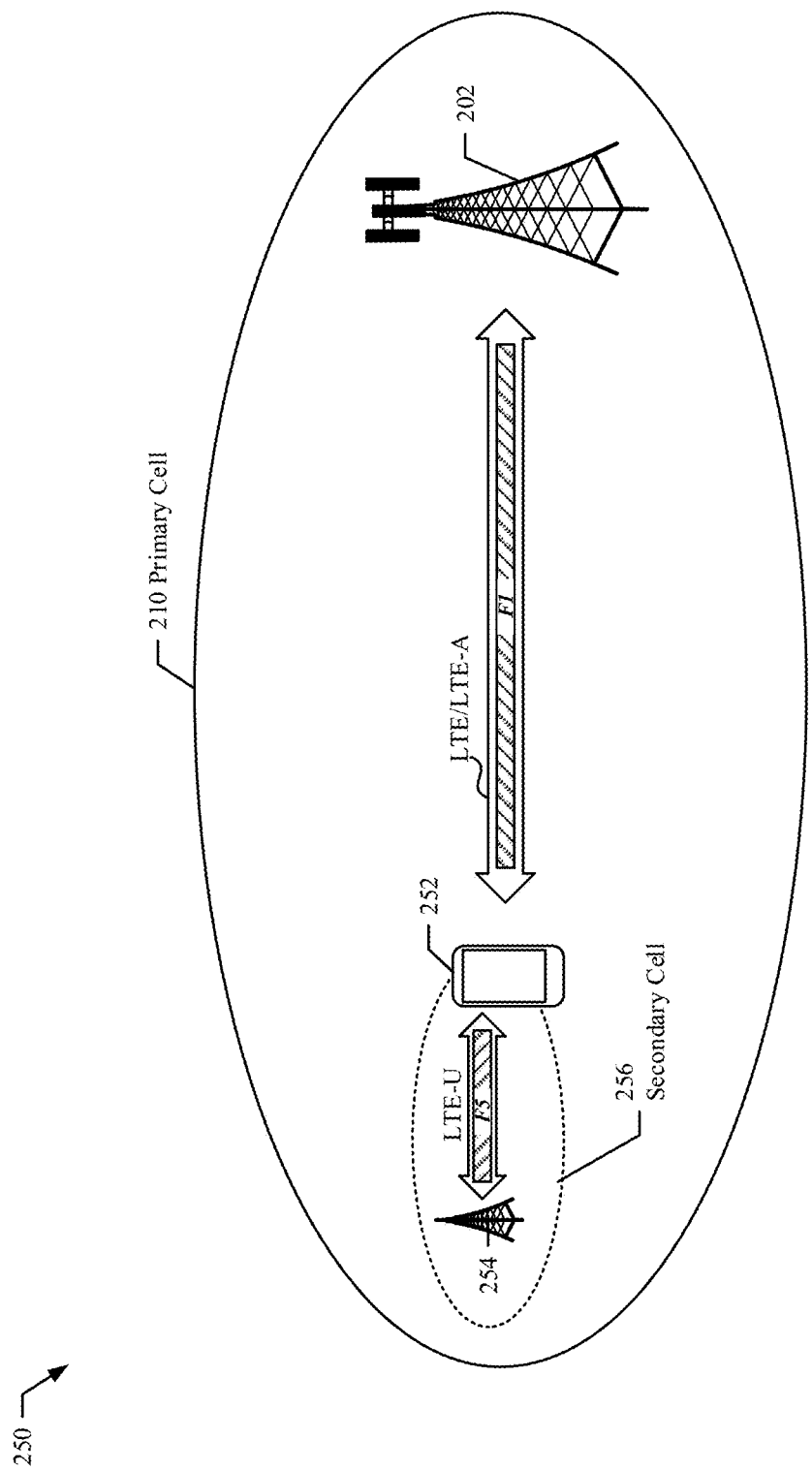

FIG. 2B illustrates a diagram 250 for another wireless communication network depicting a wireless communication device, which can be an LTE-U capable UE 252, in communication with the primary cell 210 via a primary component carrier at radio frequency F1 (in accordance with an LTE/LTE-A wireless communication protocol) and with a secondary cell 256 via a secondary component carrier at radio frequency F5. In some embodiments, the wireless network provider can operate the "small" cell 218 using a carrier in an unlicensed radio frequency band. The secondary carrier in the unlicensed radio frequency band can be referred to as an LTE-Unlicensed (LTE-U) carrier, and the LTE-U capable UE 252 can be operate in accordance with an LTE-U wireless communication protocol. As discussed further herein, the wireless network provider can, in some embodiments, provide for communication with the LTE-U capable UE 252 using both the primary carrier in a licensed radio frequency band, e.g., via frequency resource F1, and the secondary carrier in an unlicensed radio frequency band, e.g., via frequency resource F5 in parallel. As the unlicensed radio frequency band can be shared by other non-cellular wireless communication devices, the cellular wireless network can seek to mitigate coexistence interference between communication on the secondary component carrier in the unlicensed radio frequency band and communication using an overlapping and/or adjacent set of frequencies used by other wireless communication devices, e.g., operating in accordance with a wireless local area network (WLAN) wireless communication protocol of which Wi-Fi protocols are a representative example. As unlicensed radio frequency bands can be shared by multiple network providers and/or by a variety of wireless network equipment, the LTE-U communication via the secondary component carrier F5 in the secondary cell 256 can be "managed" by the wireless network to mitigate interference into and received from other wireless communication devices, e.g., Wi-Fi equipment. The wireless network can include equipment to schedule transmissions over the secondary component carrier F5 to share the unlicensed radio frequency band among multiple LTE-U capable wireless communication devices, e.g., multiple different LTE-U capable UEs 252. In some embodiments, a wireless network provider can also operate a wireless local area network device, e.g., a Wi-Fi "hot spot" (not shown), a secondary cell 256, and a primary cell 210 simultaneously and can manage communication via the three separate pieces of network equipment, e.g., a "managed" Wi-Fi "hot spot" access point, the secondary cell's eNodeB (base station) 254 (or a "femto cell" or equivalent), and the primary cell's eNodeB (base station) 202. The wireless network provider can manage the combination of network equipment in communication with multiple wireless communication devices to mitigate coexistence interference, to provide for offloading of traffic between various network equipment, to provide for selection by the LTE-U capable UE 252 to establish connections via one or more of the various network equipment, to provide for reselection between various network equipment, to share communication using parallel component carriers, etc. In some embodiments, the wireless network provider can use a set of access network discovery and selection function (ANDSF) policy objects to provide for the management of communication using the multiple types of access network equipment, including a combination of eNodeB (base station) 202, "small" cell network equipment, e.g. eNodeB (base station) 254, and managed WLAN (Wi-Fi) access points (not shown).

Figure 2C:
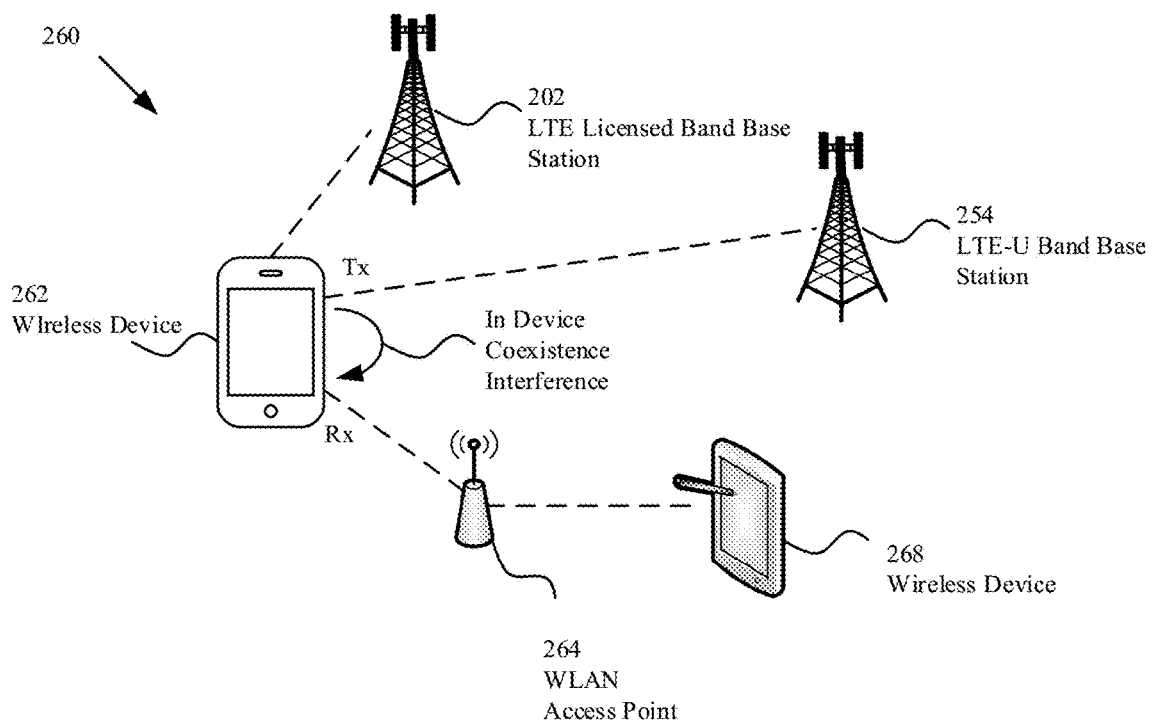
FIGS. 2C and 2D illustrate representative wireless communication systems including radio frequency coexistence interference in accordance with some embodiments.
Figure 2D:
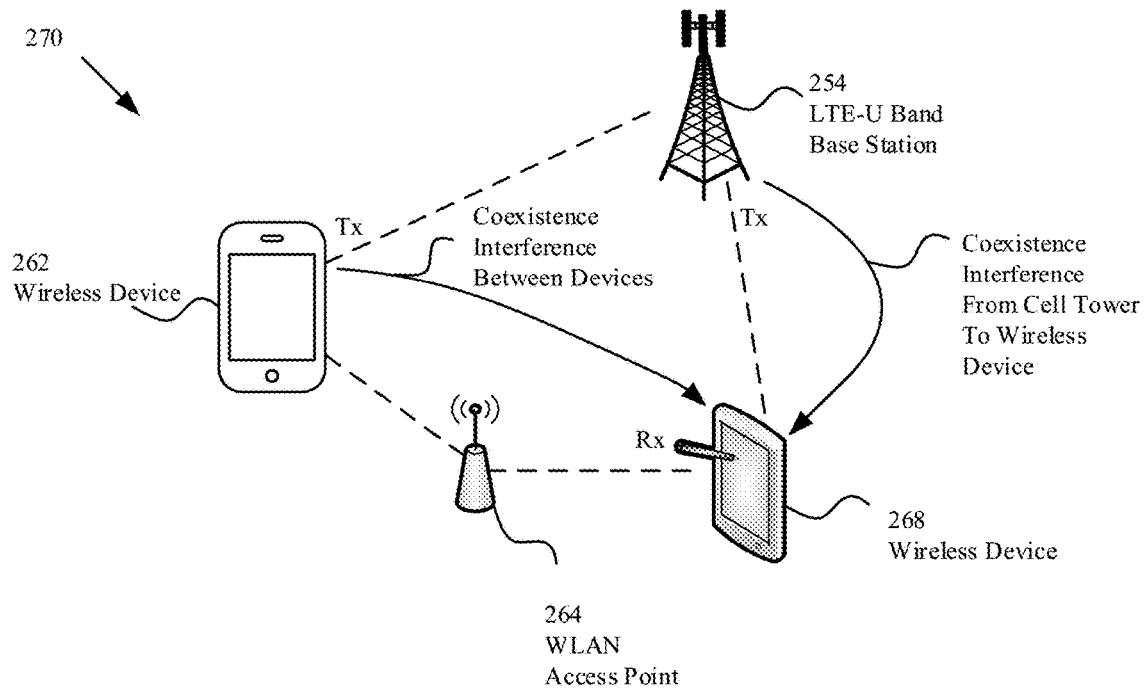

FIGS. 2C and 2D illustrate representative wireless communication systems that can experience radio frequency coexistence interference, in accordance with some embodiments. FIG. 2C illustrates a wireless communication system 260 in which a wireless communication device 262 can communicate simultaneously using a cellular wireless communication protocol, e.g., transmitting to an eNodeB (base station) 202 over a primary component carrier in a licensed LTE frequency band and to a cell tower (base station) 254 over a secondary component carrier in an unlicensed radio frequency band, while also receiving communication in accordance with a WLAN wireless communication protocol from a WLAN access point 264. The WLAN access point can also communicate with another wireless communication device 268, which in some embodiments can operate only using a WLAN wireless communication protocol. The WLAN access point 264, together with the wireless devices 262 and 268, can form a WLAN that uses a particular radio frequency channel in an unlicensed radio frequency band. When the wireless device 262 transmits on the same radio frequency channel or on a radio frequency channel that overlaps with the WLAN radio frequency channel, e.g., to an LTE-U capable base station 254, the receiver of the wireless device 262 can encounter "in device" coexistence radio frequency interference. As the cellular transmitter and the WLAN receiver can be collocated in the wireless device 262, in some embodiments, the WLAN receiver and/or the cellular transmitter can undertake actions to mitigate effects of the "in device" coexistence radio frequency interference, e.g., by minimizing overlapping transmission times and/or changing use of frequency channels to provide for reduced radio frequency interference from the cellular transmitter into the WLAN receiver.

Radio frequency interference, however, can also occur between two different wireless devices or from access network equipment of a cellular wireless network (e.g., communicating with the same wireless device 268 as the wireless WLAN access point 264) as illustrated by the wireless communication system 270 in FIG. 2D. A cellular transmitter of a nearby wireless device 262 that communicates with the LTE-U capable base station 254 can not only interfere with its own WLAN receiver but also with the WLAN receiver of another wireless device, e.g., wireless device 268, which can seek to communicate with the WLAN access point 264 using the same frequency channel and/or using one or more overlapping radio frequency channels occupied by the LTE-U cellular transmitter of the wireless device 262. Similarly, a cellular transmitter of an LTE-U band base station 254 that communicates with one or more wireless devices, including for example the wireless device 268, can cause coexistence interference in the wireless device 268, which can seek to communicate with the WLAN access point 264 using the same and/or overlapping radio frequency channels as used by the cellular transmitter of the LTE-U band base station 254. In some embodiments, the wireless device 268 can seek to receive signals from both a WLAN access point 264 and from an LTE-U band base station 254 of a cellular wireless network. When both the WLAN access point 264 and the LTE-U band base station use the same radio frequency channel and/or one or more overlapping radio frequency channels, e.g., in an unlicensed radio frequency band, reception by the wireless device 268 of signals from the WLAN access point 264 and/or from the LTE-U band base station 254 (e.g., using separate parallel wireless circuitry) can interfere with each other. In some embodiments, the receiver of the wireless device 268 can listen for and detect radio frequency signals from nearby cellular transmitters, such as from the LTE-U band base station 254 or other wireless devices 262 that overlap and/or use the radio frequency channels used for WLAN communication and can seek to minimize and/or mitigate the effect of the radio frequency interference from the cellular transmissions. In some embodiments, transmissions of the wireless device 262 can be managed, e.g., by the wireless device 262 itself, and/or by wireless network equipment, e.g., via control signals provided through the LTE eNodeB (base station) 202 and/or the LTE-U capable eNodeB (base station) 254, to mitigate coexistence interference between the wireless devices 262 and 268. As described further herein, the wireless device 262 can transmit using a time division multiplexing scheme and/or using frequency hopping to share all or portions of the unlicensed radio frequency band with other wireless devices, e.g., with the wireless device 268.

In a typical WLAN communication system, e.g., based on a carrier sense multiple access (CSMA) protocol, a wireless client device, e.g., 268, can decode an incoming WLAN packet to determine its destination. As communication in the WLAN communication system can be "unscheduled," any incoming WLAN packet can be destined for the wireless client device 268. In some embodiments, the wireless client device 268 can detect and decode the preamble of the WLAN packet, and by doing so, the wireless client device 268 can determine whether the radio frequency channel (which can also be referred to as the "medium") is occupied for communication by another WLAN client device. WLAN communication protocols can require that signals at a level of −82 dBm or higher be detectable and decodable by the WLAN client device 268 and by the WLAN access point 264 in order for the CSMA mechanism to perform properly. In a typical WLAN client device 268, WLAN signals at a level of −90 dBm or higher can be detected and decoded. The detection and decoding, however, can rely on the presence of a preamble at the beginning of the WLAN packet for detection, and when communications do not include a detectable preamble, the WLAN client device 268 can rely instead on a simple energy detection mechanism to determine the presence of a radio frequency interferer.

The WLAN communication protocol can require that a radio signal having an energy level of −62 dBm or higher be detectable by the WLAN client device 268. This detectable energy level is for radio frequency signals that may or may not be decodable by the WLAN client device 268 and is substantially higher than the decodable level for formatted packets that include a preamble for detection by the WLAN client device 268. When detecting the energy of the interfering radio signal, which can also be referred to as measuring a received signal strength indication (RSSI) level of −62 dBm or higher, the WLAN client device 268B can acknowledge that the radio frequency channel is "busy" or otherwise "occupied" and can wait for a future "clear" transmission time. The WLAN client device 268 can thus "sense" the presence of a "carrier" in the radio frequency channel and provide for "fair" access to another WLAN device using the radio frequency channel. Both the wireless communication device 262 communicating using an LTE-U secondary component carrier and the WLAN client device 268 communicating using a WLAN wireless communication protocol can be subject to radio frequency interference when they attempt to occupy all or portions of the same radio frequency channel at the same time. Wireless packets for the LTE communication system and/or the WLAN communication system can be corrupted due to the radio frequency interference unless a proper detection and "back off" mechanism is employed. In some embodiments, a WLAN client device 268 and/or a WLAN AP 264 can scan one or more radio frequency channels in a radio frequency band (or in multiple radio frequency bands) to detect the presence of an LTE cellular system. The cellular transmissions of the wireless device 262 in the unlicensed radio frequency band can include gaps in time and/or can use different radio frequency channels over time to provide for "clear" transmission time intervals and/or radio frequency channels (or more generally portions of radio frequency spectrum in unlicensed radio frequency bands) during which the WLAN client device 268 can communicate with the WLAN AP 264. In some embodiments, all wireless communication devices 262 that use a secondary component carrier in a carrier aggregation scheme that operates using at least in part a frequency band that overlaps with the unlicensed radio frequency band, e.g., as used by the WLAN client device 268 and the WLAN AP 264, can be managed to provide for "clear" transmission times and/or "clear" radio frequency channels to permit "fair" sharing of the unlicensed radio frequency band among multiple wireless communication devices, including LTE-U capable devices, LTE assisted access (LAA) capable devices, and WLAN (Wi-Fi) devices.

Figure 3A:
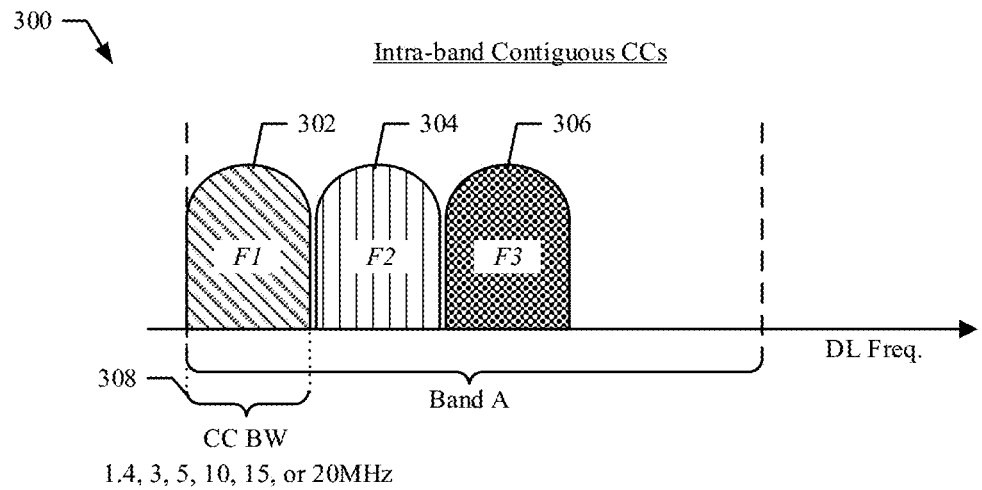
FIGS. 3A, 3B, and 3C illustrate three distinct carrier aggregation representations that depict two intra-band component carrier (CC) frequency resource diagrams and one inter-band CC frequency resource diagram, in accordance with some embodiments.
Figure 3B:
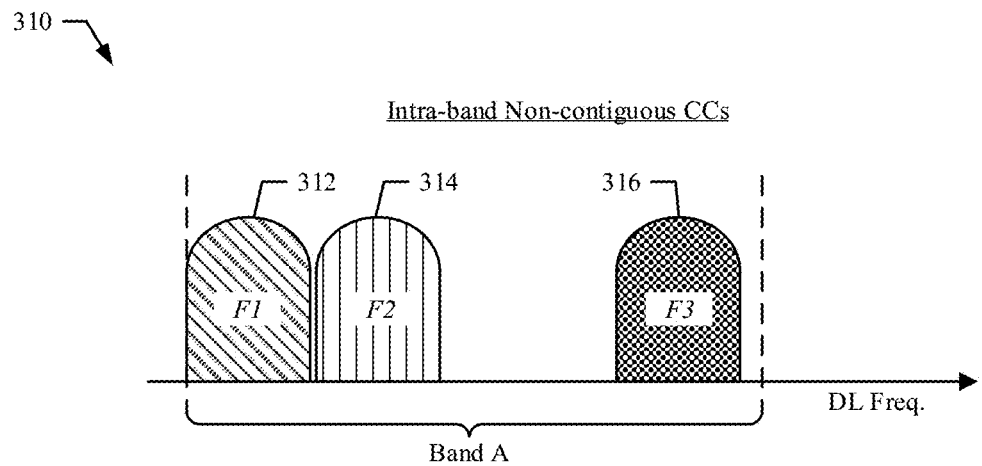
Figure 3C:
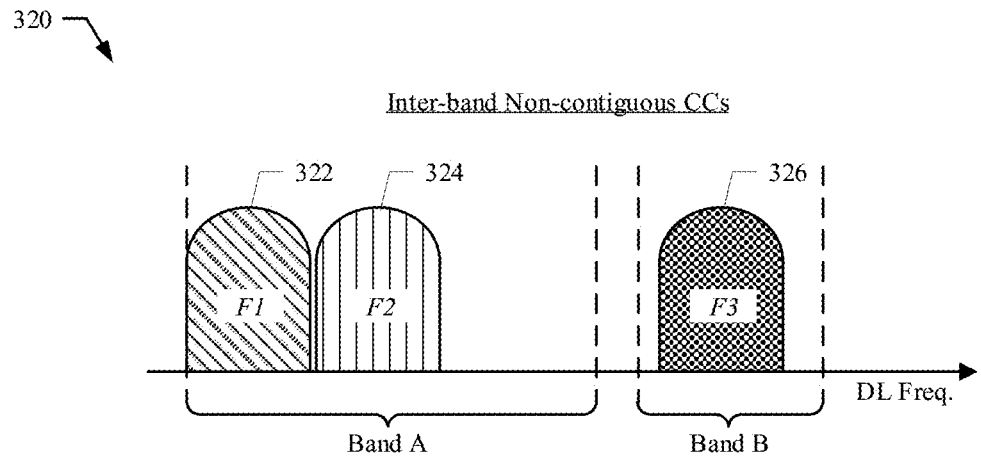

FIGS. 3A, 3B, and 3C illustrate three distinct carrier aggregation representations depicting two intra-band CC frequency resource diagrams, 300 and 310, and one inter-band CC frequency resource diagram 320, in accordance with various embodiments. As is generally understood, in 3GPP LTE and LTE-A, an individual CC can be limited to communicating at various designated system bandwidths 308 ranging from 1.4 MHz up to 20 MHz. As such, the cumulative DL data rate throughput achievable by using carrier aggregation scenarios can increase over the single carrier data-rate throughput of roughly 300 Mbits/sec. by a multiplier value, e.g., related to the number of CCs employed (up to 5 CCs in LTE-A) in parallel and based on bandwidths of the constituent CCs. For telecommunication networks employing LTE-A, interoperability with predecessor LTE versions can require LTE-A CCs to employ a system bandwidth equivalent to earlier LTE version counterparts. As such, the peak single CC LTE-A system bandwidth can be capped at 20 MHz for inter-LTE RAT compatibility. However, in various carrier aggregation scenarios, an aggregate set of LTE-A CCs may be able to achieve cumulative bandwidths of up to 100 MHz (5 CCs×20 MHz, the maximum LTE standard system bandwidth) using one or more allocated LTE spectrum bands.

FIG. 3A illustrates a carrier aggregation representation depicting an intra-band contiguous CC frequency resource diagram 300, where each aggregated CC, 302, 304, and 306, is associated with its own distinct frequency resource, F1, F2, or F3, within the same service provider designated DL frequency band, Band A. A frequency resource, in some embodiments, can also be referred to as a frequency carrier, carrier, or frequency channel. In the intra-band contiguous CC scenario, the three frequency resources, F1, F2, and F3, are sequential CC frequencies in the frequency domain positioned adjacent one another in Band A. FIG. 3B illustrates a carrier aggregation representation depicting an intra-band non-contiguous CC frequency resource diagram 310, where each aggregated CC, 312, 314, and 316, is associated with its own distinct frequency resource, F1, F2, or F3, within a single DL frequency band, Band A. However, in the intra-band non-contiguous CC scenario illustrated in frequency resource diagram 310, the three frequency resources, F1, F2, and F3, can be CC frequencies that are respectively separated by one or more intervening frequency channels in the frequency domain, within Band A, e.g., as illustrated by the separation of frequency channels F2 and F3. FIG. 3C illustrates a carrier aggregation representation depicting an inter-band non-contiguous CC frequency resource diagram 320, where each aggregated CC, 322, 324, and 326, is associated with its own distinct frequency resource, F1, F2, or F3, spread across two service provider designated DL frequency bands, Band A and Band B. In the inter-band non-contiguous CC scenario, the frequency resources, F1 and F2, of Band A can be CC frequencies that are separated from the frequency resource F3 of Band B in the frequency domain. For reference, 3GPP LTE-A Release 10 specifies carrier aggregation for LTE, while LTE-A Releases 11 and 12 describe various carrier aggregation enhancements including various inter-band CC band pairings. It should be understood that telecommunications service providers generally operate using both similar and dissimilar licensed LTE frequency spectrum bands. For example, within the United States, Verizon's® LTE networks operate in the 700 and 1700/2100 Mhz frequency spectra using Bands 13 and 4, whereas AT&T's® LTE networks operate in the 700, 1700/2100, and 2300 MHz frequency spectra using Bands 17, 4, and 30. In addition to communicating via carrier aggregation using radio frequency channels in one or more licensed radio frequency bands, wireless network providers can provide for communicating using frequency resources in unlicensed radio frequency bands in parallel with licensed radio frequency bands, e.g., to supplement communication over a primary component carrier in a licensed radio frequency band with a secondary component carrier in an unlicensed radio frequency band.

Figure 3D:
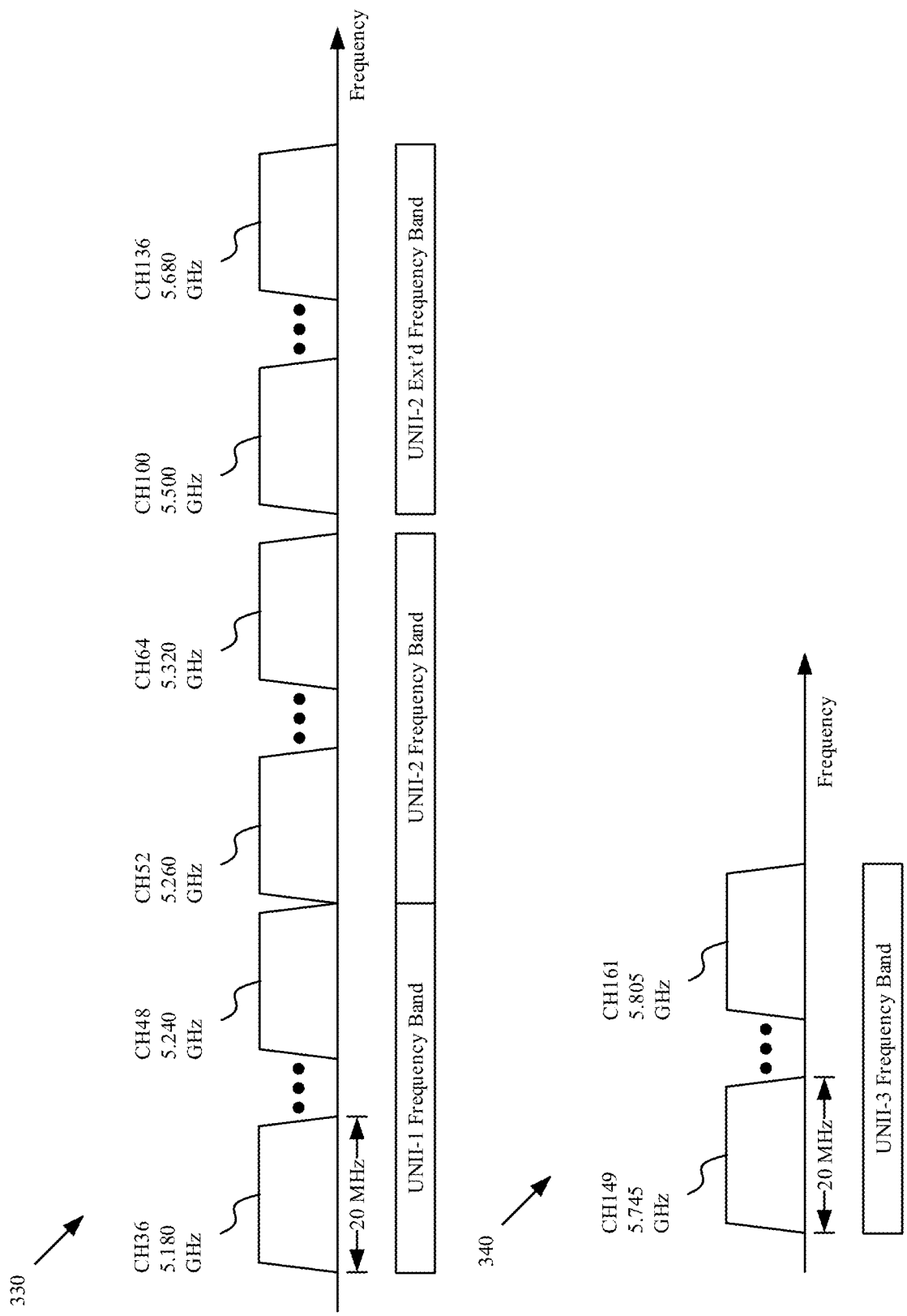
FIG. 3D illustrates a representative set of parallel radio frequency channel for use in an unlicensed radio frequency band by a wireless communication device, in accordance with some embodiments.
Figure 3E:
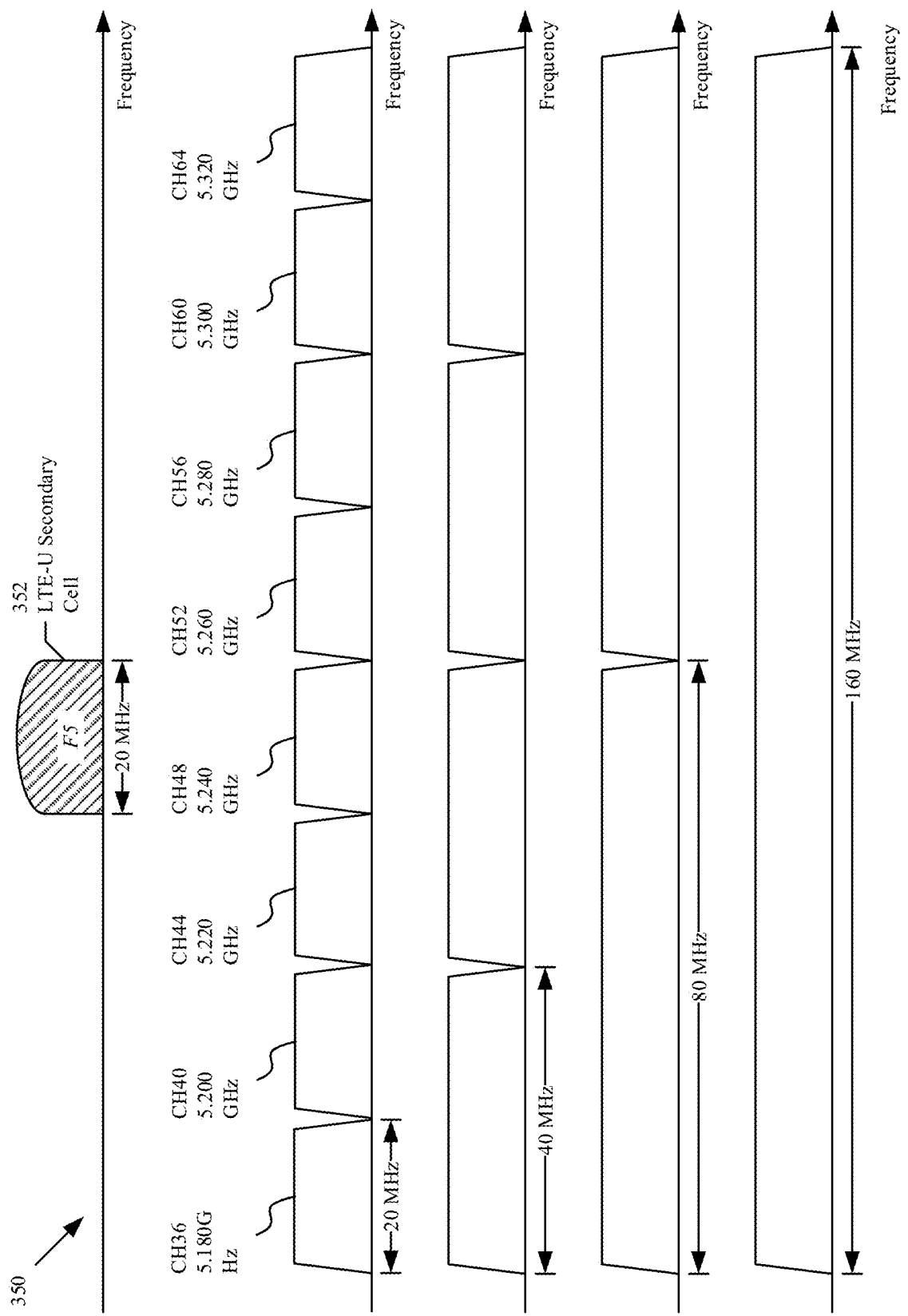
FIGS. 3E and 3F illustrate overlapping frequency channels of an LTE-U wireless communication system and a Wi-Fi wireless communication system, in accordance with some embodiments.

FIG. 3D illustrates a set of radio frequency channels available for use by wireless local area network (WLAN) systems in an unlicensed radio frequency band, in accordance with some embodiments. A "client" WLAN device can be any wireless communication device capable of communicating via a wireless local area network (WLAN) technology, e.g., in accordance with a wireless local area network communication protocol. In some embodiments, the WLAN technology can include a Wi-Fi (or more generically a WLAN) wireless communication subsystem (which can also be referred to in some embodiments as a radio), the Wi-Fi wireless communication subsystem can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. The set of 802.11 Wi-Fi communication protocols utilize a region of radio frequency spectrum in the Industrial, Scientific, and Medical (ISM) radio frequency bands, e.g., 2.4 to 2.5 GHz, and the "5 GHz" radio frequency band, e.g., spanning from approximately 4.9 to 5.8 GHz. The "higher" radio frequency bands can provide for wider radio frequency channels that offer more bandwidth and higher data rates. The "lower" radio frequency bands can provide a wider coverage area due to lower path loss and therefore greater range. Typically, WLAN client devices and WLAN access points offer the capability to operate in one or multiple unlicensed radio frequency bands. Additional radio frequency bands are planned for future use by WLAN wireless communication devices, and wireless communication protocol standards are being developed to use the additional radio frequency bands including those in the television "white space" frequencies, e.g. in the very high frequency (VHF) and ultra high frequency (UHF) bands, i.e., near 600 MHz, as well as at frequencies near 3.5 GHz. Radio frequency channels, used by WLAN client devices and WLAN access points in the 5 GHz unlicensed radio frequency band, can span approximately 20 MHz of radio frequency bandwidth as illustrated in FIG. 3D. In addition, WLAN client devices can use multiple 20 MHz radio frequency channels together to provide wider radio frequency bandwidth channels as illustrated in FIG. 3E. Thus, WLAN client devices may not only use 20 MHz wide frequency channels, but also 40 MHz, 80 MHz, and/or 160 MHz wide radio frequency channels. Higher bandwidth radio frequency channels can provide for higher data rate throughput, but can also be subject to more radio frequency interference from other wireless systems, transmissions from which can overlap with all or a portion of the WLAN radio frequency channels.

As illustrated by the diagram 350 in FIG. 3E, an LTE-U secondary cell 352 operating on a radio frequency channel F5 and occupying approximately 20 MHz of bandwidth, can overlap with all or a portion of radio frequency spectrum used by a WLAN system operating in the same frequency range of the unlicensed radio frequency band. For example, the LTE-U secondary cell 352 can operate using a frequency band that coincides with frequency channel CH48 centered at 5.240 GHz in the 5 GHz unlicensed radio frequency band. The LTE-U secondary cell 352 can also overlap in part wider bandwidth frequency channels that use additional frequency channels. To mitigate coexistence interference between communication systems that use the same radio frequency band with overlapping radio frequency channels, the cellular wireless network can include methods to share all or portions of the unlicensed radio frequency band, e.g., through time division multiplexing and/or frequency hopping techniques.

Figure 3F:
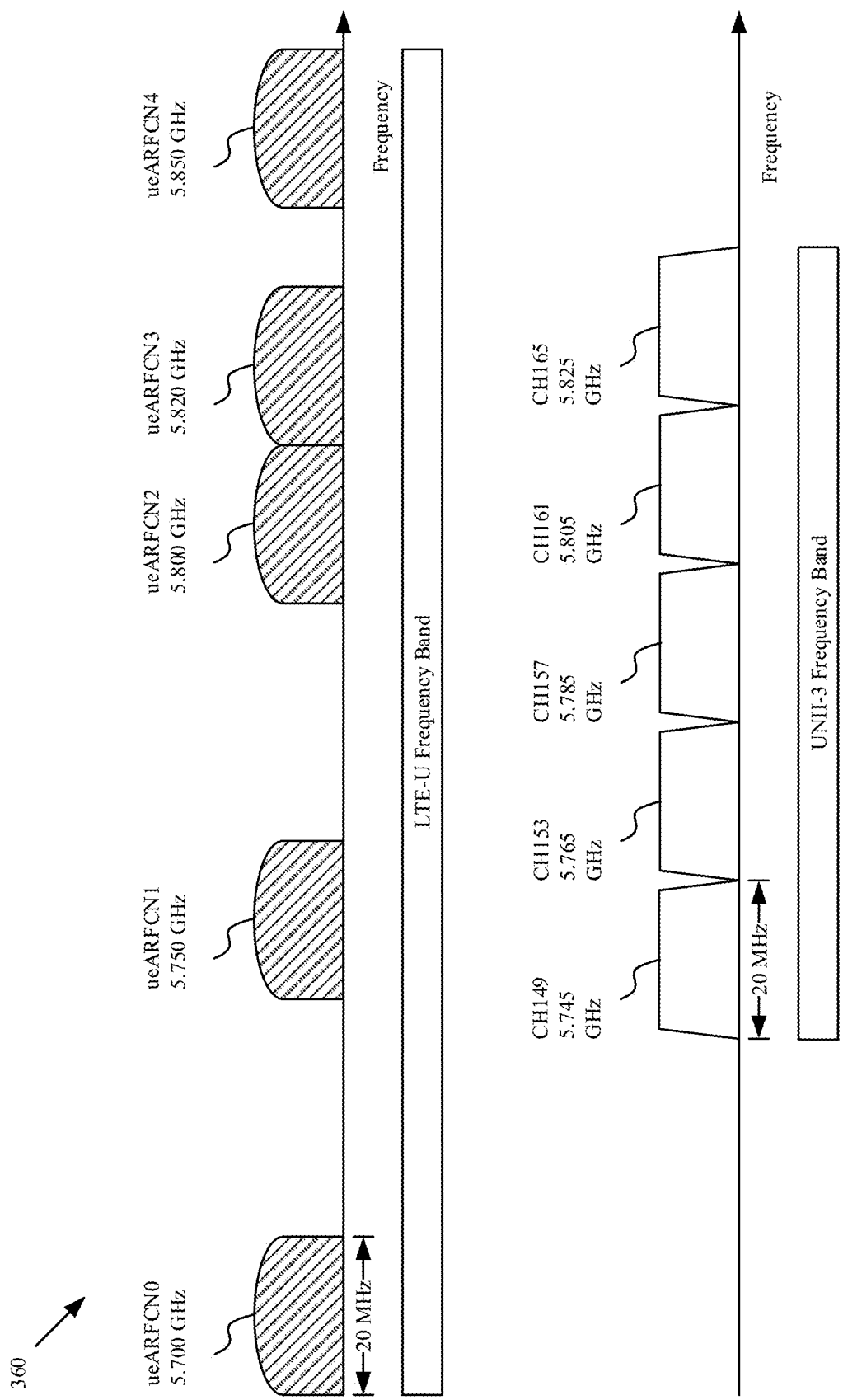

FIG. 3F illustrates a diagram 360 including a representative set of LTE-U radio frequency channels that span a portion of the 5 GHz unlicensed radio frequency band that can be used by a cellular wireless network. In some embodiments, a wireless network provider can use one or more of the set of LTE-U radio frequency channels to communicate with a wireless communication device, e.g., via a secondary component carrier for carrier aggregation. A primary component carrier in a licensed radio frequency band (not shown) can be used in parallel with one or more secondary component carriers to provide for carrier aggregation. The primary component carrier can be used to provide control signals to manage when and how to use the secondary component carriers in the unlicensed radio frequency band. In some embodiments, only one secondary component carrier in the unlicensed radio frequency band is used in parallel with the primary component carrier in the licensed radio frequency band. In some embodiments, multiple secondary component carriers in the unlicensed radio frequency band can be used, e.g., in parallel simultaneously and/or in series sequentially (or in a frequency hopping order).

While FIGS. 3E and 3F illustrate representative LTE-U radio frequency channels in the 5 GHz unlicensed radio frequency band, other unlicensed radio frequency bands, such as other ISM bands, can also be used similarly to provide radio frequency spectrum for secondary cells. In some embodiments, an LTE-U capable wireless communication device can communicate via one or more LTE-U secondary cells in one or more unlicensed radio frequency bands, e.g., the 2.4 GHz and/or 5 GHz unlicensed radio frequency bands. Each of the LTE-U secondary cells can use LTE-U radio frequency channels that can span 20 MHz, or that can span another bandwidth ranging vary in bandwidth, and the LTE-U capable wireless communication device can support multiple LTE-U radio frequency channels supporting a range of bandwidth for LTE-U communication by the LTE-U capable wireless communication device that spans any frequency bandwidth required, e.g., from 5 MHz up to 100 MHz of radio frequency spectrum. In some embodiments, the LTE-U capable wireless communication device operates in a 2.4 GHz unlicensed radio frequency band. In some embodiments, the LTE-U capable wireless communication device operates in a 5 GHz unlicensed radio frequency band. In some embodiments, the LTE-U capable wireless communication device operates in a combination of one or more unlicensed radio frequency bands, e.g., the 2.4 GHz unlicensed radio frequency band and/or the 5 GHz unlicensed radio frequency band. Thus, while FIG. 3E illustrates the LTE-U secondary cell 352 operating at a frequency F5 within the 5 GHz unlicensed radio frequency band, the LTE-U secondary cell 352 can also operate, in some embodiments, using a different bandwidth, e.g., 5 MHz, and/or in a different unlicensed radio frequency band, e.g., the 2.4 GHz unlicensed radio frequency band. Similarly, the set of LTE-U radio frequency channels illustrated in FIG. 3F can each occupy 20 MHz of bandwidth, in some embodiments, or another range of bandwidth, including different bandwidths for each different radio frequency channel. The LTE-U radio frequency band can also overlap with another unlicensed radio frequency band, e.g., the 2.4 GHz unlicensed radio frequency band, or another ISM radio frequency band, and is not necessarily limited to use in the 5 GHz radio frequency band illustrated.

FIG. 3G illustrates a table 370 of UL/DL subframe configurations for an LTE frame that can be used for formatting communication in an LTE TDD wireless network. Each UL/DL subframe configuration specifies a sequence of DL subframes, UL subframes, and special subframes. For example, UL/DL subframe configuration #0 is defined by subframes #0 to #9, which specify a subframe sequence of DSUUUDSUUU, where "D" indicates a DL subframe, "U" indicates an UL subframe, and "S" indicates a special subframe. For TDD LTE communication, an eNodeB configures a UE to use a particular frame structure that includes a mixture of downlink subframes, uplink subframes, and "special" subframes (which transition from downlink to uplink transmission). Of the seven LTE TDD frame structures illustrated in FIG. 3G, the frame structures labels as UL/DL configuration #1 and #2 are most commonly deployed, and each of these particular UL/DL configurations include two repeated five millisecond subframe patterns per ten millisecond frame.

Figure 3H:
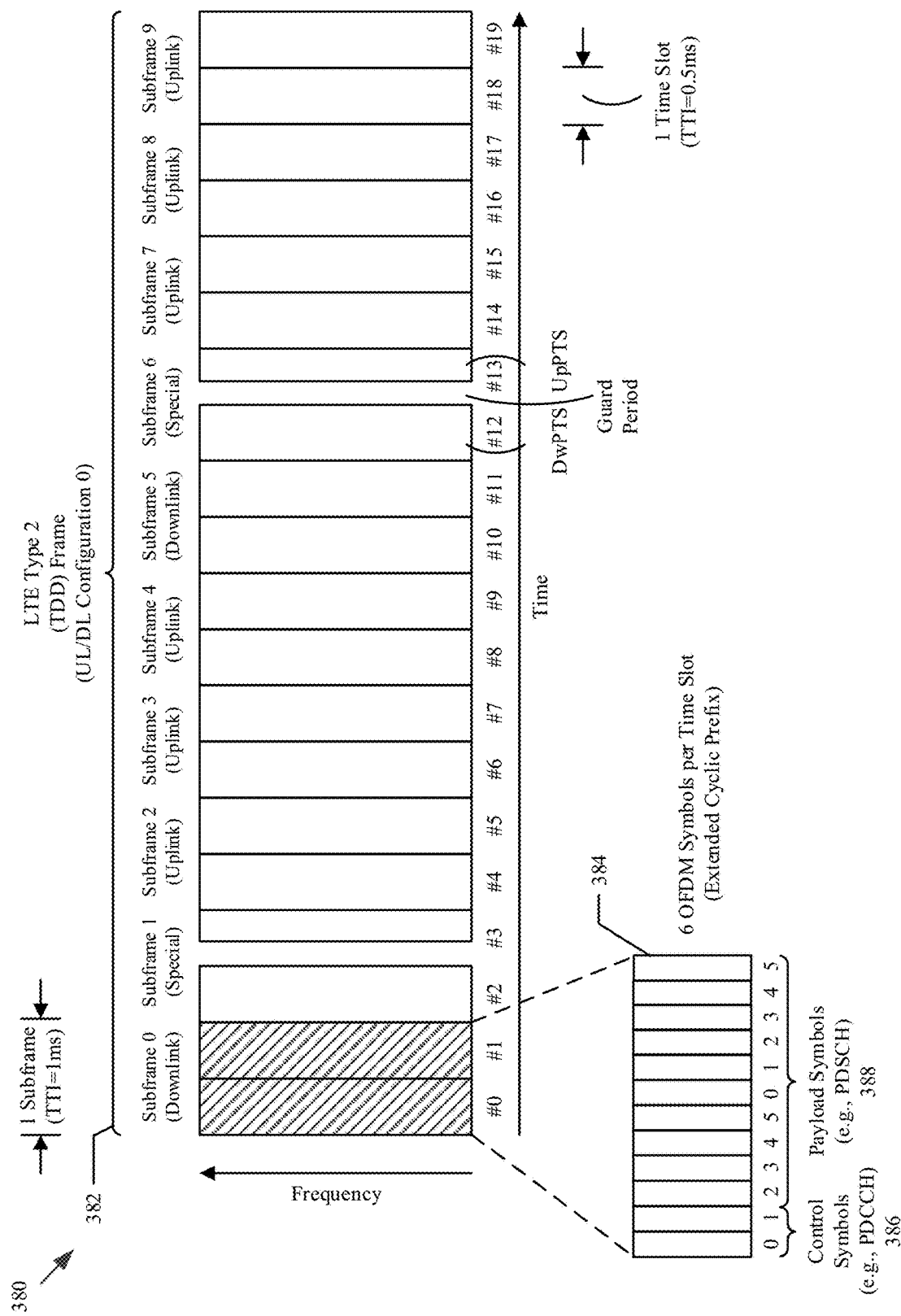
FIG. 3H illustrates details for a particular LTE TDD UL/DL subframe configuration, in accordance with some embodiments.

FIG. 3H illustrates an LTE frame structure 380 for an LTE time division duplex (TDD) frame 382, also referred to as an LTE Type 2 (TDD) frame, which can used for downlink and uplink transmission between an eNodeB and UE operating in accordance with an LTE TDD communications protocol. Each LTE Type 2 TDD frame 382 spans a time period of ten milliseconds (10 ms) subdivided into ten consecutive subframes (numbered from subframe #0 to subframe #9), each subframe spanning one millisecond (1 ms). Each LTE Type 2 TDD Frame 382 includes one or more downlink (DL) subframes (for transmission from the eNodeB to the UE), one or more uplink (UL) subframes (for transmission from the UE to the eNodeB), and one or more special subframes. Special subframes include a downlink portion, a guard period, and an uplink portion. The guard period separates the UL portion from the DL portion and accounts for a round trip delay between the UE and the eNodeB and for multipath delay spread. The downlink portion of a special subframe can be referred to as a downlink pilot time slot (DwPTS), while the uplink portion of a special subframe can be referred to as an uplink pilot time slot (UpPTS). Special subframes can be used for TDD communication when transitioning from downlink transmission to uplink transmission, but are not used when transitioning from uplink transmission to downlink transmission.

FIG. 3H illustrates the LTE frame structure 380 for a particular LTE TDD UL/DL subframe configuration for an LTE Type 2 frame, namely an UL/DL configuration #0, which includes two special subframes. As indicated in table 370 of FIG. 3G, LTE TDD UL/DL subframe configurations can include one or two special subframes. The downlink and uplink subframes of the LTE Type 2 TDD frame 382 are divided into two time slots, each time slot spanning 0.5 milliseconds, while special subframes are divided into three time periods. Each downlink subframe 384 includes multiple orthogonal frequency-division multiplexing (OFDM) symbols, which can include a combination of control symbols 386 and payload symbols 388. A configuration for an LTE Type 2 TDD frame 382 can be specified in information broadcast by an eNodeB in a system information block (SIB) message. The number of downlink subframes, special subframes, and uplink subframes can vary for different LTE TDD UL/DL subframe configurations used as illustrated in Table 370 of FIG. 3G.

FIG. 3H illustrates that each subframe includes two timeslots, and each timeslot includes six OFDM symbols when an extended cyclic prefix is used. Therefore, a subframe includes twelve OFDM symbols in total. Among the twelve OFDM symbols, the first two OFDM symbols are control symbols, e.g., used to communicate a physical downlink control channel (PDCCH) 386, while the remaining ten OFDM symbols are payload symbols, e.g., used to communicate a physical downlink shared channel (PDSCH) 388. FIG. 3H also illustrates the structure of a special subframe, as previously discussed. Referring to subframe 6, a special subframe includes three distinct regions: a DwPTS—Downlink Pilot Time Slot, a GP—Guard Period and an UpPTS—Uplink Pilot Time Slot. The regions of the special subframe are individually configurable in terms of length, although the total length of all three regions of the special subframe together span one ms, as for any other subframe. The DwPTS is reserved for downlink transmission, while the UpPTS and the subframe that immediately follows the special subframe are reserved for uplink transmission.

Figure 3I:
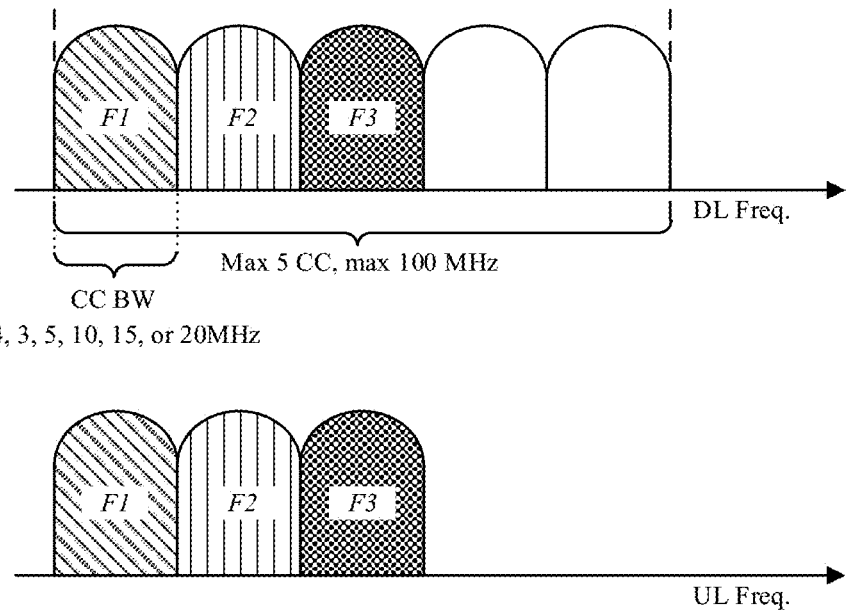
FIGS. 3I and 3J illustrate representative DL/UL component carrier allocations for LTE TDD communication, in accordance with some embodiments.
Figure 3J:
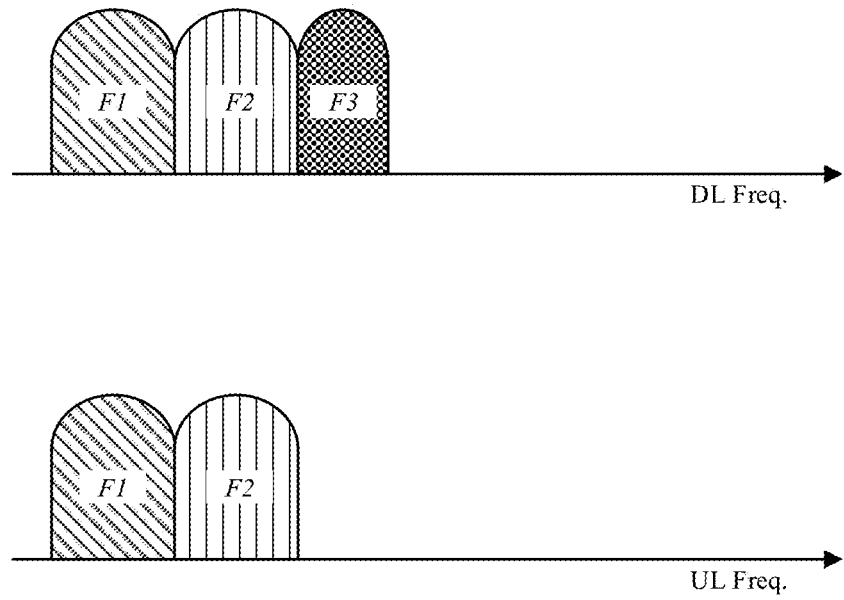

FIGS. 3I and 3J illustrate representative DL/UL component carrier allocations for LTE TDD communication, in accordance with some embodiments. For a TDD LTE system that includes a carrier aggregation capability, e.g., as introduced in the 3GPP Release 10 LTE-Advanced specification, a set of carriers can be aggregated to provide a wider than 20 MHz transmission bandwidth for a single UE. As illustrated in FIGS. 3I and 3J, in some embodiments, the downlink and uplink allocations for a particular UE can be symmetric and use a same set of component carriers, while in some embodiments, the downlink and uplink allocations for a particular UE can be asymmetric and use a different set of component carriers in each direction. As shown by the DL/UL allocation 390 in FIG. 3I, a set of up to a maximum of five component carriers, each component carrier occupying up to a maximum of 20 MHz, can be aggregated to form a common bandwidth up to 100 MHz wide. The DL/UL allocation 390 illustrated in FIG. 3I, indicates that both the downlink component carriers, e.g., at frequencies F1, F2, and F3, and the uplink component carriers, also at frequencies F1, F2, and F3, can occupy the same bandwidths of the DL radio frequency spectrum. Thus each downlink and uplink component carrier can be allocated the same bandwidths and the same frequencies to realize a "symmetric" DL/UL allocation 390. Alternatively, as shown in FIG. 3J, for an asymmetric DL/UL allocation 392, the uplink component carriers can differ from the downlink component carriers, in that some component carriers can be used for downlink transmission only, e.g., the component carrier at frequency F3, while other component carriers can be used for both downlink transmission and uplink transmission, e.g., the component carriers at frequencies F1 and F2. One or more network elements, e.g., an eNodeB (or equivalent base station and/or controller combination), can determine the DL/UL allocation used for a particular UE.

Figure 3K:
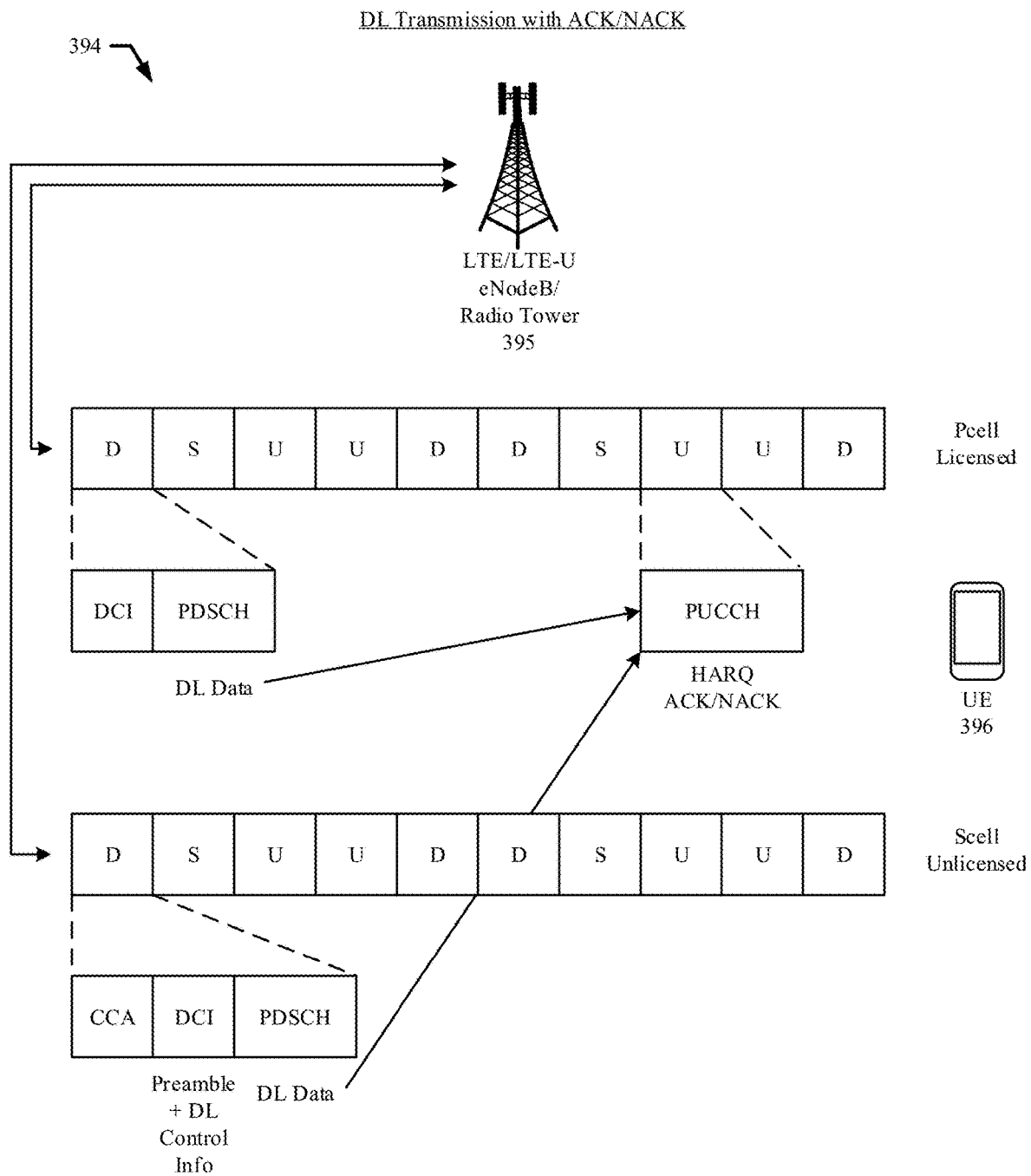
FIG. 3K illustrates a diagram for a representative TDD-LTE frame structure and DL communication with ACK/NACK between a wireless communication device and a wireless access network portion of a wireless network, in accordance with some embodiments.

FIG. 3K illustrates a diagram 394 for a representative TDD-LTE frame structure and DL communication with ACK/NACK between an LTE/LTE-U eNodeB (Radio Tower) 395 and a UE 396 using a combination of a primary cell (Pcell) in a licensed radio frequency band and a secondary cell (Scell) in an unlicensed radio frequency band. Transmission by the eNodeB 395 and the UE 396 in the Pcell and the Scell can be frame aligned, so that corresponding subframes of a frame in each cell occur during the same time periods. Both the Pcell and the Scell can use the same TDD-LTE UL/DL configuration for the frame structure, e.g., UL/DL configuration #1 as shown in FIG. 3K (and also illustrated in the table 370 of FIG. 3G). The eNodeB 395 can transmit on the Pcell in the licensed radio frequency band in accordance with a TDD-LTE wireless communication protocol during downlink subframes (indicated as 'D' in the frame structure). The downlink subframe can include downlink control information (DCI) on the PDCCH physical channel, the DCI indicating a schedule for uplink resources assigned to the UE 396 (for UL transmission from the UE 396 to the eNodeB 395 during an uplink subframe) and downlink resources assigned for DL transmission from the eNodeB 395 to the UE 396 during a downlink subframe. The DL data can be transmitted from the eNodeB 395 to the UE 396 on the PDSCH physical channel.

The eNodeB 395 can also schedule transmission on the Scell in the unlicensed radio frequency band during downlink subframes, using a "listen before talk" mechanism to determine whether a portion of the unlicensed radio frequency band is "available". The time period for sensing by the eNodeB 395 for whether the unlicensed radio frequency band is indicated as a clear channel assessment (CCA) time period within the 'D' subframe. In some embodiments, the CCA time period can span at least 20 micro-seconds (or 34 micro-seconds, or another fixed time period, or a variable time period that can increase up to a maximum length time period with each CCA attempt). When the eNodeB 395 senses that the portion of the unlicensed radio frequency band is available, downlink control information (DCI) can be transmitted to indicate resource assignments for downlink and uplink transmissions in the Scell unlicensed radio frequency band. The DCI can include (and/or be supplemented by) a preamble to provide for "reserving" the channel for transmission by the eNodeB 395. DL data can subsequently be transmitted during resources as indicated in the DCI using the PDSCH.

The UE 306 can respond to the DL data received in the Pcell licensed radio frequency band and in the Scell unlicensed radio frequency band using HARQ ACK/NACK messages communicated on the PUCCH of an uplink subframe (indicated as 'U' in the frame structure) in the Pcell licensed radio frequency band. Thus, signaling messages to acknowledge (or negatively acknowledge) receipt of downlink data from the eNodeB 395 on the PCC of the Pcell in the licensed radio frequency band or on the SCC of the Scell in the unlicensed radio frequency band are sent on the PCC of the Pcell in the licensed radio frequency band. The signal messages to acknowledge (or negatively acknowledge) receive of the DL data are not sent using the SCC of the Scell in the unlicensed radio frequency band.

Figure 3L:
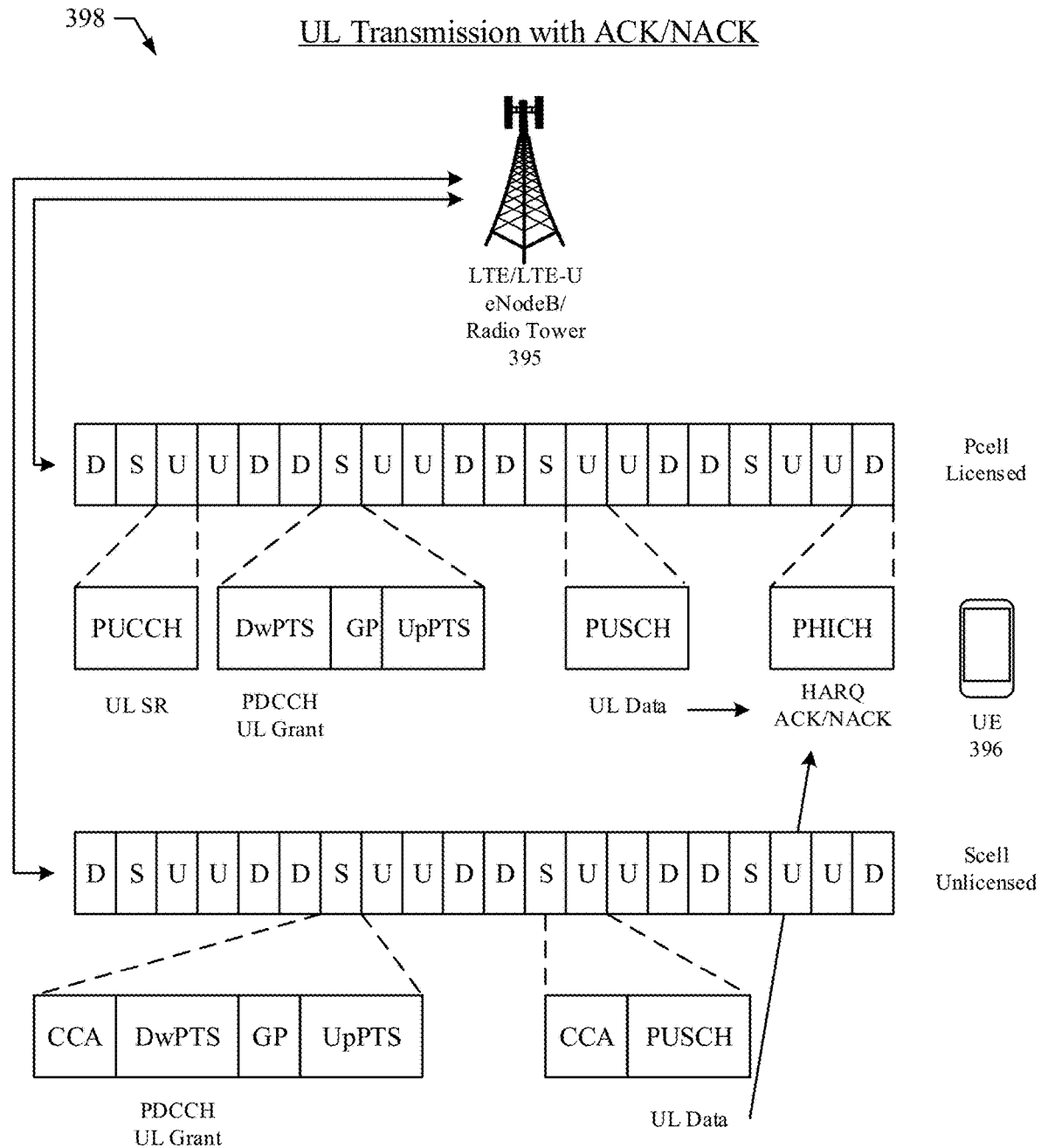
FIG. 3L illustrates a diagram for a representative TDD-LTE frame structure and UL communication with ACK/NACK between a wireless communication device and a wireless access network portion of a wireless network, in accordance with some embodiments.

FIG. 3L illustrates a diagram 398 for a representative frame TDD-LTE frame structure and UL communication with ACK/NACK between an LTE/LTE-U eNodeB/Radio Tower 395 and a UE 396 using a combination of a Pcell in a licensed radio frequency band and an Scell in an unlicensed radio frequency band. As per FIG. 3K, transmissions by the eNodeB 395 and the UE 396 in the Pcell and the Scell can be frame aligned, so that corresponding subframes of a frame in each cell occur during the same time periods. Both the Pcell and the Scell can use the same TDD-LTE UL/DL configuration for the frame structure, e.g., UL/DL configuration #1 as shown in FIG. 3L (and also illustrated in the table 370 of FIG. 3G). The UE 396 can submit a scheduling request (SR) for radio resources on which to communicate UL data to the eNodeB 395 using a control channel, e.g., the PUCCH physical channel, in the Pcell licensed radio frequency band during an "uplink" subframe (indicated as 'U' in the frame structure). The eNodeB 395 can respond to the SR from the UE 396 by transmitting a UL grant to the UE 396 during a subsequent DL transmission opportunity in the Pcell licensed radio frequency band, e.g., during a downlink subframe or during a downlink portion of a special subframe (the special subframe indicated as 'S' in the frame structure). The UL grant can indicate a future uplink subframe on which to communicate the UL data in the Pcell licensed radio frequency band. The UL grant for the Pcell licensed radio frequency band can be communicated using the PDCCH physical channel in the Pcell licensed radio frequency band. The eNodeB 395 can also provide a UL grant to the UE 396 for the Scell unlicensed radio frequency band in response to the SR received from the UE 396. The eNodeB 395 can use a downlink subframe or a downlink portion of a special subframe in the Scell unlicensed radio frequency band to communicate the UL grant for the Scell unlicensed radio frequency band. Thus, the response to the SR from the UE 396 can include both a UL grant for UL communication by the UE 396 in the Pcell licensed radio frequency band and/or a UL grant for UL communication by the UE 396 in the Scell unlicensed radio frequency band, with each UL grant being communicated to the UE 396 by the eNodeB 395 using the corresponding radio frequency band.

In some embodiments, the eNodeB 395 uses cross-scheduling to communicate UL grants for communication in the Scell unlicensed radio frequency band by sending the UL grants for the Scell in the Pcell licensed radio frequency band. In some embodiments, the eNodeB 395 communicates any DL grants or UL grants for the Scell in the Pcell licensed radio frequency band.

In some embodiments, the eNodeB 395 sends DL grants for the Pcell and DL grants for the Scell in the Pcell licensed radio frequency band. In some embodiments, the eNodeB 395 sends UL grants for the Pcell in the Pcell licensed radio frequency band and UL grants for the Scell in the Scell unlicensed radio frequency band. In some embodiments, the UE 396 transmits a scheduling request (SR) for UL resources in the Pcell licensed radio frequency band to the eNodeB 395, and the eNodeB 395 responds with UL grants for UL transmissions in the Pcell by the UE 396 in the Pcell licensed radio frequency band and/or with UL grants for UL transmission in the Scell by the UE 396 in the Scell unlicensed radio frequency band. In some embodiments, the eNodeB 395 uses a "clear channel assessment" (CCA) mechanism to determine whether a portion of the unlicensed radio frequency band is available for transmission by the eNodeB 395 before sending the UL grant for the Scell to the UE 396 in the Scell unlicensed radio frequency band. As shown in FIG. 3L, the eNodeB 395 can communicate a UL grant on the PDCCH physical channel of the Pcell licensed radio frequency band during a Downlink Pilot Time Slot (indicated as 'DwPTS' in FIG. 3L) of a "special" subframe (indicated as 'S' in FIG. 3L) for communication of UL data by the UE 396 in the Pcell licensed radio frequency band. As also shown in FIG. 3L, the eNodeB 395 can communicate a PDCCH UL grant on the PDCCH physical channel of the Scell unlicensed radio frequency band during a DwPTS of a "special" subframe (after a CCA time period) for communication of UL data by the UE 396 in the Scell unlicensed radio frequency band. The UE 396 can transmit UL data on the PUSCH physical channel of the Pcell in a subsequent "uplink" subframe in the Pcell licensed radio frequency band (as indicated in the UL grant received in the Pcell licensed radio frequency band). The UE 396 can also transmit UL data on the PUSCH physical channel of the Scell in a subsequent "uplink" subframe in the Scell unlicensed radio frequency band (as indicated in the UL grant received in the Scell unlicensed radio frequency band). In some embodiments, the UE 396 can use a CCA mechanism to assess whether the unlicensed radio frequency band is available for transmission by the UE 396 of the UL data before transmitting the UL data on the PUSCH of the Scell in the Scell unlicensed radio frequency band. In some embodiments, the CCA time period can occur as part of an Uplink Pilot Time Slot (UpPTS) of a special subframe that precedes an uplink subframe in which the UL data is communicated on the PUSCH of the Scell in the Scell unlicensed radio frequency band. In some embodiments, the eNodeB 395 responds to UL data received in the Pcell licensed radio frequency band or received in the Scell unlicensed radio frequency band with one or more HARQ ACK and/or NACK messages communicated in the PHICH physical channel in a downlink subframe in the Pcell licensed radio frequency band. Thus, DL HARQ ACK/NACK messages from the eNodeB 395 to the UE 396 for UL data communicated in the Pcell licensed radio frequency band or in the Scell unlicensed radio frequency band are acknowledged (or negatively acknowledged) to the UE 396 using the Pcell licensed radio frequency band (and not using the Scell unlicensed radio frequency band).

To ensure fair access to the Scell unlicensed radio frequency band, in some embodiments, the eNodeB 395 uses a CCA mechanism to detect energy in at least a portion of the Scell unlicensed radio frequency band before transmitting in the Scell unlicensed radio frequency band. The eNodeB 395 can use the CCA mechanism to detect an energy level of at least −82 dB for a continuous time period spanning at least 20 micro-seconds (or 34 micro-seconds, or another fixed time period) before transmitting in the Scell unlicensed radio frequency band. In some embodiments, the eNodeB 395 uses the CCA mechanism to monitor multiple portions of the Scell unlicensed radio frequency band and subsequently transmits (if required and available) in one or more portions of the Scell unlicensed radio frequency band. When the eNodeB 395 determines that one or more portions of the Scell unlicensed radio frequency band are available, the eNodeB 395 can generate a preamble signal to reserve at least one of the one or more portions of the Scell unlicensed radio frequency band. The eNodeB 395 can send the preamble signal in the Scell unlicensed radio frequency band after the CCA time period to reserve the at least one of the one or more portions of the Scell unlicensed radio frequency band. In some embodiments, the eNodeB 395 can send the preamble signal in the Scell unlicensed radio frequency band to reserve at least a portion of the unlicensed radio frequency band for a forthcoming transmission, e.g., by sending the preamble signal for a fixed length time period spanning between one and four milliseconds, during which other wireless communication devices can detect the preamble and thereby sense that the eNodeB 395 seeks to reserve at least a portion of the unlicensed radio frequency band for transmission by the eNodeB 395. In some embodiments, the eNodeB 395 can send the preamble signal in the Scell unlicensed radio frequency band to provide a signal for time synchronization and/or frequency synchronization by an LTE-U capable wireless communication device, e.g., in addition to sending the preamble to reserve a portion of the unlicensed radio frequency band for future transmission.

In some embodiments, the eNodeB 395 communicates downlink control information (DCI) in the Pcell licensed radio frequency band to indicate a schedule of the DL data communication on the PDSCH physical channel in the Pcell licensed radio frequency band. In some embodiments, the eNodeB 395 communicates downlink control information (DCI) in the Pcell licensed radio frequency band to indicate a schedule of the DL data communication on the PDSCH physical channel in the Scell unlicensed radio frequency band. In some embodiments, the eNodeB 395 communicates downlink control information (DCI) in the Scell unlicensed radio frequency band to indicate a schedule of the DL data communication on the PDSCH physical channel in the Scell unlicensed radio frequency band. The UE 396 can receive DL data in the PDSCH physical channel in the Pcell licensed radio frequency band and respond with one or more HARQ ACK/NACK messages in the PUCCH physical channel in the Pcell licensed radio frequency band. The UE 396 can also receive DL data in the PDSCH physical channel in the Scell unlicensed radio frequency band and respond with one or more HARQ ACK/NACK messages in the PUCCH physical channel in the Scell unlicensed radio frequency band. Thus, in some embodiments, DL data can be communicated from the eNodeB 395 in the Pcell licensed radio frequency band and/or the Scell unlicensed radio frequency band with DL control information communicated in the Pcell licensed radio frequency band for both the Pcell DL data and the Scell DL data. In some embodiments, the PDCCH physical channel is not required in the Scell unlicensed radio frequency band, as the information can be carried instead in the PDCCH physical channel in the Pcell licensed radio frequency band. In some embodiments, DL control information for the Pcell DL data can be communicated in the Pcell licensed radio frequency band and DL control information for the Scell DL data can be communicated in the Scell unlicensed radio frequency band. In some embodiments, UL responses to Pcell DL data and to Scell DL data, e.g., HARQ ACK/NACK messages can be communicated in the Pcell licensed radio frequency band.

DL data transmission from the eNodeB 395 to the UE 396 in the Scell unlicensed radio frequency band can by confined to the boundary of the downlink subframe (indicated as 'D' in FIG. 3K). In some embodiments, DL data transmission from the eNodeB 395 to the UE 396 in the Scell unlicensed radio frequency band can be bounded to maximum length continuous time period, e.g., up to a maximum of four milliseconds or a maximum of five milliseconds or another fixed time period. When the eNodeB 395 determines that a portion of the Scell unlicensed radio frequency band is "not available", e.g., based on the clear channel assessment mechanism, the eNodeB 395 can repeat the clear channel assessment sensing after a back-off time period. In some embodiments, the eNodeB 395 can use an exponentially increasing back-off time period each time the eNodeB 395 determines that the portion of the Scell unlicensed radio frequency band is not available (within a total CCA portion of a DL subframe in which the eNodeB 395 seeks to transmit DL data in the Scell unlicensed radio frequency band). In some embodiments, the eNodeB 395 can increase the time period for each successive sensing during the CCA portion of the DL subframe, e.g., doubling the value of a time period during which the portion of the Scell unlicensed radio frequency band must be "clear" in order for the eNodeB 395 to determine that transmission to the UE 396 can occur. In some embodiments, the eNodeB 395 can limit the maximum time period for sensing to a threshold value, e.g., up to a maximum of one millisecond or other fixed time period. For DL signaling and data communication from the eNodeB 395 to the UE 396, the UE 396 can be not required to perform CCA mechanism in order to receive DL data in the Scell unlicensed radio frequency band.

For UL data transmission from the UE 396 to the eNodeB 395, the UE 396 can generate and send a scheduling request (SR) on the PUCCH physical channel in the Pcell licensed radio frequency band. The SR can indicate to the eNodeB 395 that the UE 396 has UL data pending. In some embodiments, the UE 396 can include a buffer status report (BSR) as part of the SR and/or accompanying the SR communicated to the eNodeB 395. When resources are available for transmission in the Pcell licensed radio frequency band and/or in the Scell licensed radio frequency band, the eNodeB 395 can generate and send to the UE 396 an UL resource grant that can indicate when (e.g., in what subframe) and in which cell to attempt to send the UL data. The UL resource grant can be communicated from the eNodeB 395 to the UE 396 using the Pcell licensed radio frequency band, e.g., in downlink subframe or in a downlink portion of a special subframe. In some embodiments, the UL resource grant in the Pcell licensed radio frequency band can indicate UL transmission opportunities for the UE 396 in the Pcell licensed radio frequency band and/or in the Scell unlicensed radio frequency band, e.g., by using a "cross-scheduling" mechanism to schedule UL transmission in the Scell unlicensed radio frequency band based on control information provided in the PDCCH physical channel in the Pcell licensed radio frequency band. In some embodiments, the eNodeB 395 can provide LTE Assisted Access (LAA) to the UE 396 by scheduling and communicating grants for multiple subframes in which the UE 396 can communicate the UL data. In some embodiments, the grant for multiple subframes can be communicated by extending a format used for downlink control information (DCI) in the PDCCH physical channel to indicate UL grants in multiple subframes. In some embodiments, grants for multiple subframes can be communicated using a new format for DCI in the PDCCH physical channel.

When provided with a UL grant for UL transmission in the Pcell licensed radio frequency band, the UE 396 can transmit the UL data in the PUSCH physical channel in the Pcell licensed radio frequency band, e.g., during the uplink subframe indicated by the UL grant. When provided with a UL grant for UL transmission in the Scell unlicensed radio frequency band, the UE 396 can use a CCA mechanism to listen before reserving and transmitting in a portion of the Scell unlicensed radio frequency band. In some embodiments, the UE 396 can determine whether one or more portions of the Scell unlicensed radio frequency band are available by detecting whether any other wireless communication devices are using one or more portions of the Scell unlicensed radio frequency band. The UE 396 can use the CCA mechanism to detect an energy level of at least −82 dB for a continuous time period spanning at least 20 microseconds (or 34 micro-seconds, or another fixed time period) before transmitting in the Scell unlicensed radio frequency band. When the UL grant to the UE 396 indicates a UL transmission opportunity in a UL subframe that immediately follows a special subframe, the UE 396 can use an uplink portion of the special subframe for at least a portion of the CCA mechanism, e.g., during the UpPTS time period of the 'S' subframe that immediately precedes a 'U' subframe for which a UL grant was provided by the eNodeB 395 to the UE 396. When the UE 396 determines that a portion of the Scell unlicensed radio frequency band is available, the UE 396 can transmit the UL data in the PUSCH physical channel of the Scell unlicensed radio frequency band. UL data transmission by the UE 396 to the eNodeB 395 in the Scell unlicensed radio frequency band can be confined to the boundary of the "granted" subframe. As shown in FIG. 3L, frame formats (e.g., subframe designations and time allotments for TDD-LTE communication) in both the Pcell licensed radio frequency band and the Scell unlicensed radio frequency band can be time-aligned to use the same frame and subframe boundaries in both radio frequency bands. The UE 396 can transmit in the Scell unlicensed radio frequency band based on the UL grant received from the eNodeB 395. In some embodiments, the eNodeB 395 can ensure that continuous transmission by the UE 396 in the Scell unlicensed radio frequency band can be limited to no more than a fixed time period, e.g., to a maximum of four milliseconds or a maximum of five milliseconds. In some embodiments, the eNodeB 395 can ensure the UL transmissions by the UE 396 comply with regulatory constraints.

When the UE 396 determines that a portion of the Scell unlicensed radio frequency band is not available for UL transmission, e.g., based on the CCA mechanism, the UE 396 can transmit the UL data after a subsequent, successful CCA determination, e.g., when multiple UL transmission opportunities are provided by the eNodeB 395 to the UE 396 by the UL grant. In some embodiments, when the UE 396 is unable to transmit the UL data in one or more time periods provided by the UL grant, the UE 396 can deem that the UL data is "lost".

As shown in FIG. 3L, the eNodeB 395 can send HARQ ACK/NACK messages for UL data received from the UE 396 in the Pcell licensed radio frequency band or in the Scell unlicensed radio frequency band by replying in the PHICH physical channel in the Pcell licensed radio frequency band. When the eNodeB 395 configures the UE 396 with a single UL transmission opportunity (e.g., in accordance with a "legacy" LTE/LTE-A wireless communication protocol), the eNodeB 395 can send HARQ ACK/NACK messages in a corresponding downlink subframe in the Pcell licensed radio frequency band. In some embodiments, the eNodeB 395 communicates signaling messages such as UL grants (for the Pcell licensed radio frequency band or the Scell unlicensed radio frequency band) in the PDCCH of the Pcell licensed radio frequency band and HARQ ACK/NACK messages (in response to UL data received in the Pcell licensed radio frequency band or the Scell unlicensed radio frequency band) in the PHICH of the Pcell licensed radio frequency band. In some embodiments, when the UE 396 receives a HARQ NACK message in the PHICH physical channel in the Pcell licensed radio frequency band, the UE 396 can retransmit UL data during one or more subsequent UL opportunities provided in another UL grant, e.g., in accordance with a "legacy" LTE/LTE-A wireless communication protocol. When the eNodeB 395 configures the UE 396 with multiple UL transmission opportunities in the Scell unlicensed radio frequency band (e.g., using an "enhanced" grant mechanism via new and/or improved PDCCH DCI formats), the UE 396 can transmit the UL data in a first "available" UL transmission opportunity, e.g., determining whether portions of the Scell unlicensed radio frequency band are available using a CCA mechanism and transmitting the UL data when a portion of the Scell unlicensed radio frequency band is available for UL transmission (during one or more UL subframes as indicated in the UL grant). The eNodeB 395 cannot determine whether UL transmission was successful or failed until either the eNodeB 395 receives UL data as scheduled or the last of the configured UL transmission opportunities has occurred. The eNodeB 395 can thus wait until UL data is received to generate and send corresponding HARQ ACK/NACK messages or until all configured UL transmission opportunities have occurred to generate and send the corresponding HARQ ACK/NACK messages to the UE 396. In some embodiments, the eNodeB 395 can send a "bundled" HARQ ACK/NACK message corresponding to multiple UL transmission opportunities provided to the UE 396 by an "enhanced" UL grant in the PHICH physical channel of the Pcell licensed radio frequency band. In response to receiving a HARQ NACK from the eNodeB 395, the UE 396 can retransmit the UL data to the eNodeB 395 during a subsequent UL transmission opportunity. When the UE 396 retransmits the UL data in the Scell unlicensed radio frequency band, the UE 396 can use the CCA mechanism to check whether a portion of the Scell unlicensed radio frequency band is available before retransmitting the UL data in response to the HARQ NACK message received.

Figure 4A:
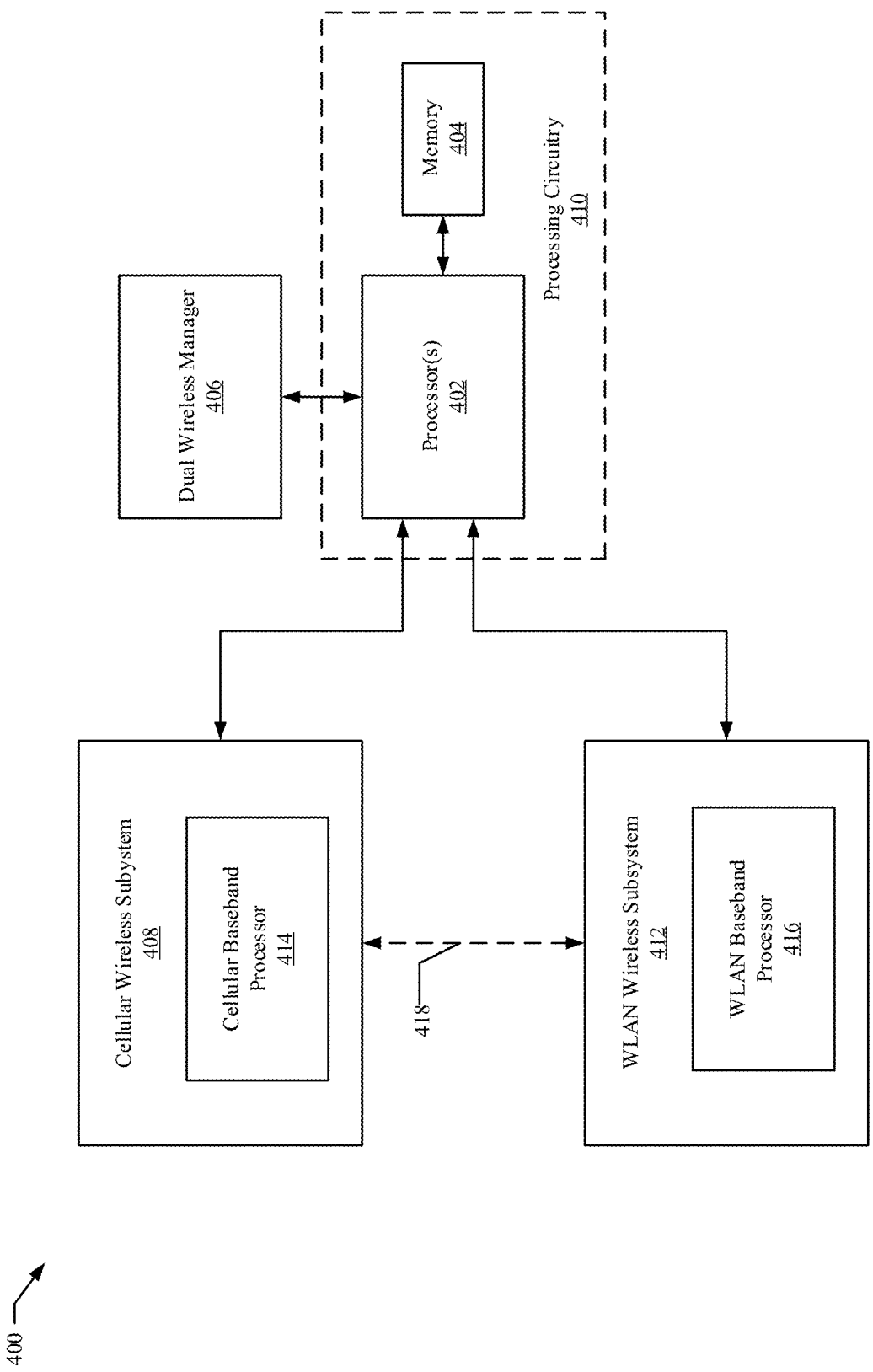
FIGS. 4A and 4B illustrate block diagrams of wireless communication devices, in accordance with some embodiments.

FIG. 4A illustrates a block diagram of an apparatus 400 that can be implemented on an LTE-U capable wireless communication device, in accordance with some example embodiments. It will be appreciated that the components, devices or elements illustrated in and described with respect to FIG. 4A may not be mandatory and thus some may be omitted in certain embodiments. Additionally, some embodiments can include further or different components, devices or elements beyond those illustrated in and described with respect to FIG. 4A. Further, it will be appreciated that, in some example embodiments, one or more components of the apparatus 400 can be distributed across a plurality of computing devices that can collectively provide the functionality of an LTE-U capable wireless communication device to operate using multiple radio frequency bands, including carrier aggregation via a primary component carrier in a Pcell licensed radio frequency band and a secondary component carrier in an Scell unlicensed radio frequency band. The apparatus 400 can provide for management of communication in licensed and unlicensed radio frequency bands simultaneously. The apparatus 400 can further provide for time sharing of radio frequency channels (and/or radio frequency bandwidth) in an unlicensed radio frequency band between an LTE-U capable wireless communication device and other "non-cellular" wireless communication devices configured to share at least a portion of the same unlicensed radio frequency band.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the apparatus 400 in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, which each can include one or more chips. The processing circuitry 410 and/or one or more further components of the apparatus 400 can therefore, in some instances, be configured to implement an embodiment on a chipset comprising one or more chips. In some example embodiments in which one or more components of the apparatus 400 are embodied as a chipset, the chipset can be capable of enabling a computing device(s) to operate as an LTE-U capable wireless communication device, operating using radio frequency channels in an unlicensed radio frequency band together with radio frequency channels in a licensed radio frequency band using carrier aggregation across the licensed and unlicensed radio frequency bands, when implemented on or otherwise operably coupled to the computing device(s). In some embodiments, the processing circuitry 410 can include a processor 402 and, in some embodiments, such as that illustrated in FIG. 4A, can further include memory 404. The processing circuitry 410 can be in communication with or otherwise control multiple wireless subsystems, including a cellular wireless subsystem 408, which can include a cellular baseband processor 414, and a WLAN wireless subsystem 412, which can include a WLAN baseband processor 416. The processing circuitry 410 can be also in communication with a dual wireless manager module 406, which can provide rules and/or actions to manage connections using the cellular wireless subsystem 408 and the WLAN wireless subsystem 412.

The processor 402 can be embodied in a variety of forms. For example, the processor 402 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 402 can comprise a plurality of processors. The plurality of processors can be in operative communication with each other and can be collectively configured to perform one or more functionalities of the apparatus 400 as described herein. In embodiments including a plurality of processors, the plurality of processors can be implemented on a single computing device, or can be distributed across a plurality of computing devices that can collectively provide functionality of an LTE-U capable wireless communication device. In some example embodiments, the processor 402 can be configured to execute instructions that can be stored in the memory 404 or that can be otherwise accessible to the processor 402. As such, whether configured by hardware or by a combination of hardware and software, the processor 402 can be capable of performing operations according to various embodiments while configured accordingly.

In some example embodiments, the memory 404 can include one or more memory devices. Memory 404 can include fixed and/or removable memory devices. In some embodiments, the memory 404 can provide a non-transitory computer-readable storage medium that can store computer program instructions that can be executed by the processor 402. In this regard, the memory 404 can be configured to store information, data, applications, instructions and/or the like for enabling the apparatus 400 to carry out various functions in accordance with one or more example embodiments. In embodiments including a plurality of memory devices, the plurality of memory devices can be implemented on a single computing device, or can be distributed across a plurality of computing devices that can collectively provide functionality of an LTE-U capable wireless communication device. In some embodiments, the memory 404 can be in communication with one or more of the processor 402, the dual wireless manager module 406, the cellular wireless subsystem 408, and/or the WLAN wireless subsystem 412 via one or more busses for passing information among components of the apparatus 400.

The apparatus 400 can further include multiple wireless subsystems, e.g., the cellular wireless subsystem 408 and the WLAN wireless subsystem 412. The wireless subsystems 408/412 can include one or more mechanisms for enabling communication with other wireless communication devices and/or wireless networks. For example, the WLAN wireless subsystem 412 can be configured to enable the apparatus 400 to communicate over a WLAN. The apparatus 400 can include multiple wireless subsystems, which can each provide communication in accordance with a wireless communication protocol. In some embodiments, the multiple wireless subsystems, e.g., cellular wireless subsystem 408 and WLAN wireless subsystem 412, of the apparatus 400 can communicate with each other directly via a communication path 418 or indirectly through communication with the processing circuitry 410.

The apparatus 400 can further include a dual wireless manager module 406. The dual wireless manager module 406 can be embodied as various means, such as circuitry, hardware, a computer program product comprising computer readable program instructions stored on a non-transitory computer readable medium (for example, the memory 404) and executed by a processing device (for example, the processor 402), or some combination thereof. In some embodiments, the processor 402 (or the processing circuitry 410) can include, or otherwise control the dual wireless manager module 406. The dual wireless manager module 406 can be configured to support wireless communication using multiple wireless communication protocols and/or using a wireless communication protocol that supports communication using multiple radio frequency bands, including but not limited to communication using a licensed radio frequency band channel and an unlicensed radio frequency band channel together via carrier aggregation. The dual wireless manager module 406 can also be configured to provide management of communication using the multiple wireless subsystems 408/412, e.g., to mitigate coexistence interference between them and/or with other wireless communication devices that share an unlicensed radio frequency band.

Figure 4B:
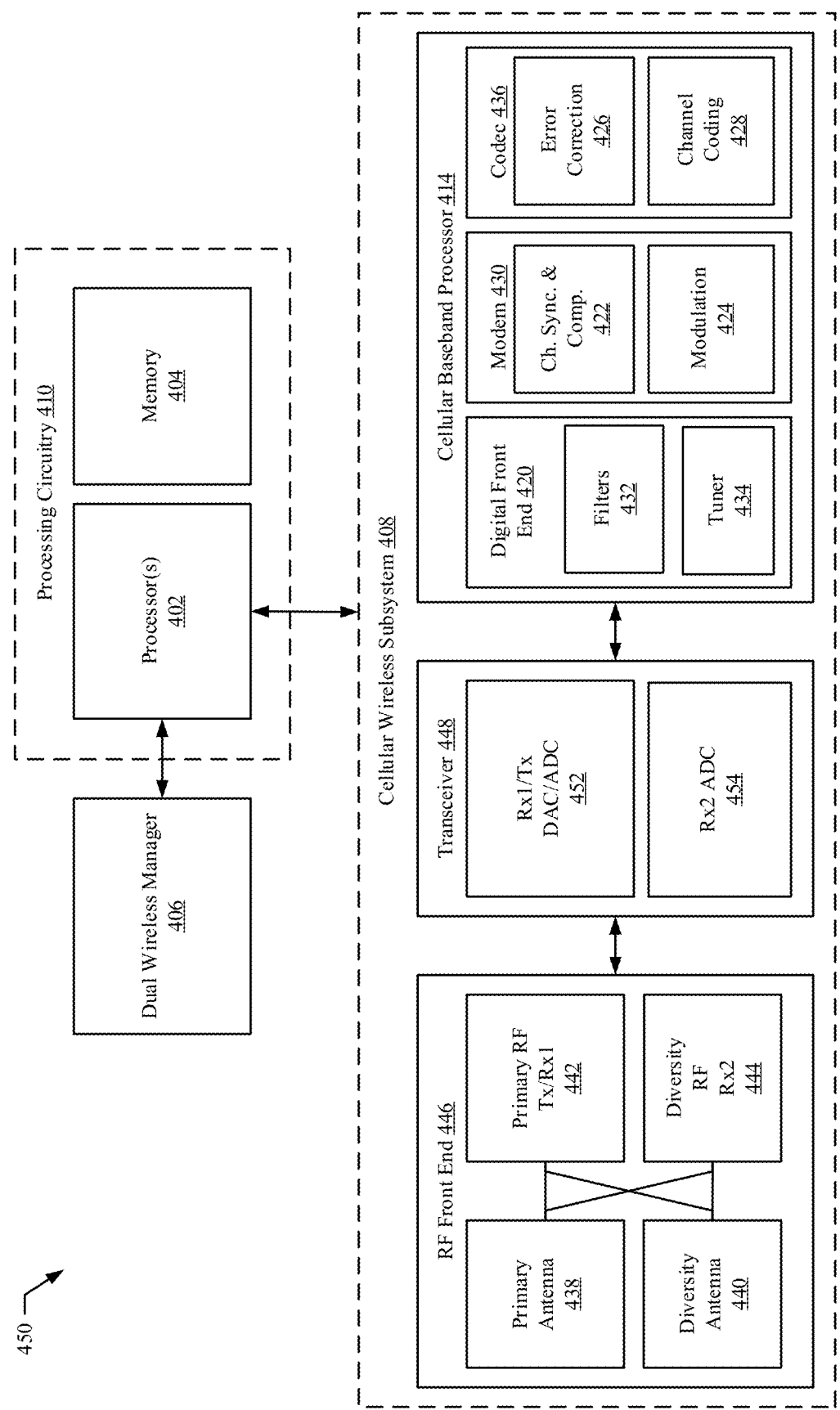

FIG. 4B illustrates a block diagram 450 of components of a wireless communication device (e.g., a UE 106, an LTE compliant UE 204/208, an LTE-A compliant UE 206, an LTE-U capable UE 252) including processing circuitry 410 having one or more processor(s) 402 and a memory 404, and a cellular wireless subsystem 408 having an cellular baseband processor 414, one or more transceiver(s) 448 and a set of RF analog front end circuitry 446. The cellular wireless subsystem 408 can include an RF front end 436 that includes a set of one or more antennas, e.g., a primary antenna 438 and a diversity antenna 440, which can be interconnected with supporting RF circuitry, e.g., a primary RF Tx/Rx1 442 component block and a diversity RF Rx2 444 component block. The primary RF Tx/Rx1 442 component block can include filters and other analog components that can be "tuned" to match transmission and/or reception of analog signals via a corresponding antenna, e.g., primary antenna 438, diversity antenna 440, or both primary and diversity antennas 338/440. In some embodiments, the RF front end 436 can be controlled by signals (e.g., digital control signals) communicated from the cellular baseband processor 414 and/or the processing circuitry 410, either directly from the processor(s) 402/414 or indirectly via another component in the cellular wireless subsystem 408.

The processing circuitry 410 and/or the cellular baseband processor 414 can be configured to perform and/or control performance of one or more functionalities of the wireless communication device in accordance with various implementations. The processing circuitry 410 and/or processing circuitry in the cellular wireless subsystem 408 can provide functionality for operating the cellular wireless subsystem to communicate using multiple component carriers via carrier aggregation across both licensed and unlicensed radio frequency bands, e.g., by executing instructions in the processor 402 and/or in the cellular baseband processor 414, in accordance with one or more embodiments. In this regard, the processing circuitry 410 and/or the cellular baseband processor 414 can be configured to perform and/or control performance of one or more functionalities of the wireless communication device in accordance with various implementations, and thus can provide functionality operation in accordance with carrier aggregation using unlicensed and licensed radio frequency bands in parallel. The processing circuitry 410 may further be configured to perform data processing, application execution, and/or other device functions according to one or more embodiments of the disclosure.

The wireless communication device, or portions or components thereof, such as the processing circuitry 410 and the cellular baseband processor 414, can include one or more chipsets, which can respectively include any number of coupled microchips thereon. The processing circuitry 410, the cellular baseband processor 414, and/or one or more other components of the wireless communication device may also be configured to implement functions associated with various procedures to manage and/or operate using combinations of licensed and unlicensed radio frequency bands.

In some embodiments, the processor(s) 402/414 may be configured in a variety of different forms. For example, the processor(s) 402/414 may be associated with any number of microprocessors, co processors, controllers, or various other computing or processing implements, including integrated circuits such as, for example, an application specific integrated circuit (ASIC), a field programmable gate array (FPGA), or any combination thereof. In various scenarios, multiple processors 402/414 of the wireless communication device can be coupled to and/or configured in operative communication with each other, and these components may be collectively configured to methods for the management and use of multiple radio frequency channels in carrier aggregation schemes that use both unlicensed and licensed radio frequency bands in parallel as described further herein.

It should be appreciated that not all of the components, device elements, and hardware illustrated in and described with respect to the wireless communication device illustrated by the block diagram 450 of FIG. 4B may be essential to this disclosure, and thus, some of these items may be omitted, consolidated, or otherwise modified within reason. Additionally, in some implementations, the subject matter associated with the wireless communication device can be configured to include additional or substitute components, device elements, or hardware, beyond those depicted within the illustrations of FIG. 4B.

Figure 5:
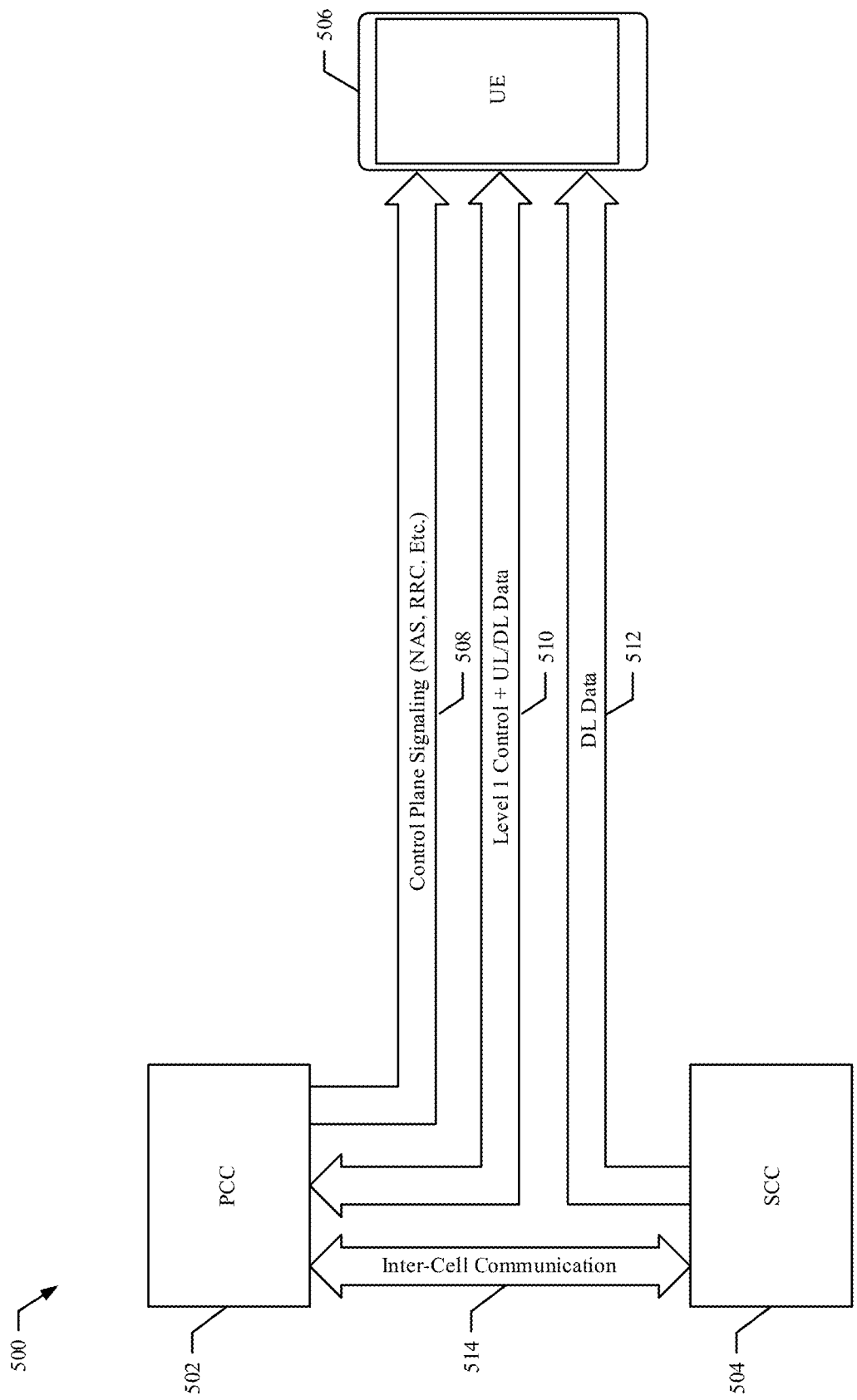
FIG. 5 illustrates a diagram of data and signaling communication between a wireless communication device and a set of network component carriers for carrier aggregation in an LTE network, in accordance with some embodiments.

FIG. 5 illustrates a block diagram 500 of control signaling and data communication using both a primary component carrier (PCC) 502, (which can include both downlink and uplink communication with a particular "primary" cell of a wireless network), and a secondary component carrier (SCC) 504, (which can provide downlink communication from another particular "secondary" cell of the wireless network). Control plane signaling, e.g., for non-access stratum (NAS) signaling and radio resource control (RRC) signaling, can be communicated between the wireless network via the primary component carrier to a wireless communication device, e.g., user equipment (UE) 506. The UE 506 can include an LTE and/or LTE-A compliant and/or LTE-U compliant wireless communication device as described elsewhere herein capable of communicating with one or more eNodeB (base stations) of a wireless network operating in accordance with LTE, LTE-A, and/or LTE-U wireless communication protocols. The UE 506 can be capable of communicating with the wireless network via both the PCC 502 and the SCC 504 simultaneously, e.g., using LTE-A carrier aggregation radio access technology (RAT) and/or using LTE-U carrier aggregation RAT (e.g., in both licensed and unlicensed radio frequency bands simultaneously). In some embodiments, downlink (DL) data is communicated from the wireless network to the UE 506 using both the PCC 502 and the SCC 504 simultaneously, i.e., employing a form of carrier aggregation as specified in various LTE/LTE-A/LTE-U wireless communication protocols, to provide an increased bandwidth and increased downlink data rate and/or throughput performance. In some embodiments, uplink (UL) data is communicated from the UE 506 to the wireless network using only the PCC 502 (and not the SCC 504) in accordance with one or more LTE/LTE-A/LTE-U wireless communication protocols. Thus, in some embodiments, the UE 506 can be configured to use carrier aggregation modes that use multiple parallel frequency carriers in shared, adjacent, or distinct frequency bands in the downlink direction and/or in the uplink direction. In some embodiments, level 1 (L1) physical (PHY) layer control data communication 510 is communicated via the PCC 502, e.g., by a default configuration and/or in accordance with LTE/LTE-A/LTE-U wireless communication protocols. In some embodiments, coordination of the communication of packet data to and from the UE 506 via the PCC 502 and the SCC 504 through two separate cells can be provided using an "inter-cell" communication link 514 between the cells. In some embodiments, control plane signaling can be used to activate and deactivate the use of secondary cells in unlicensed radio frequency bands. In some embodiments, control plane signaling can be used to provide information about secondary cells available for communication in unlicensed radio frequency bands, including for example rules for time sharing of frequency channels and/or frequency hopping among multiple frequency channels in the unlicensed radio frequency bands.

Figure 6:
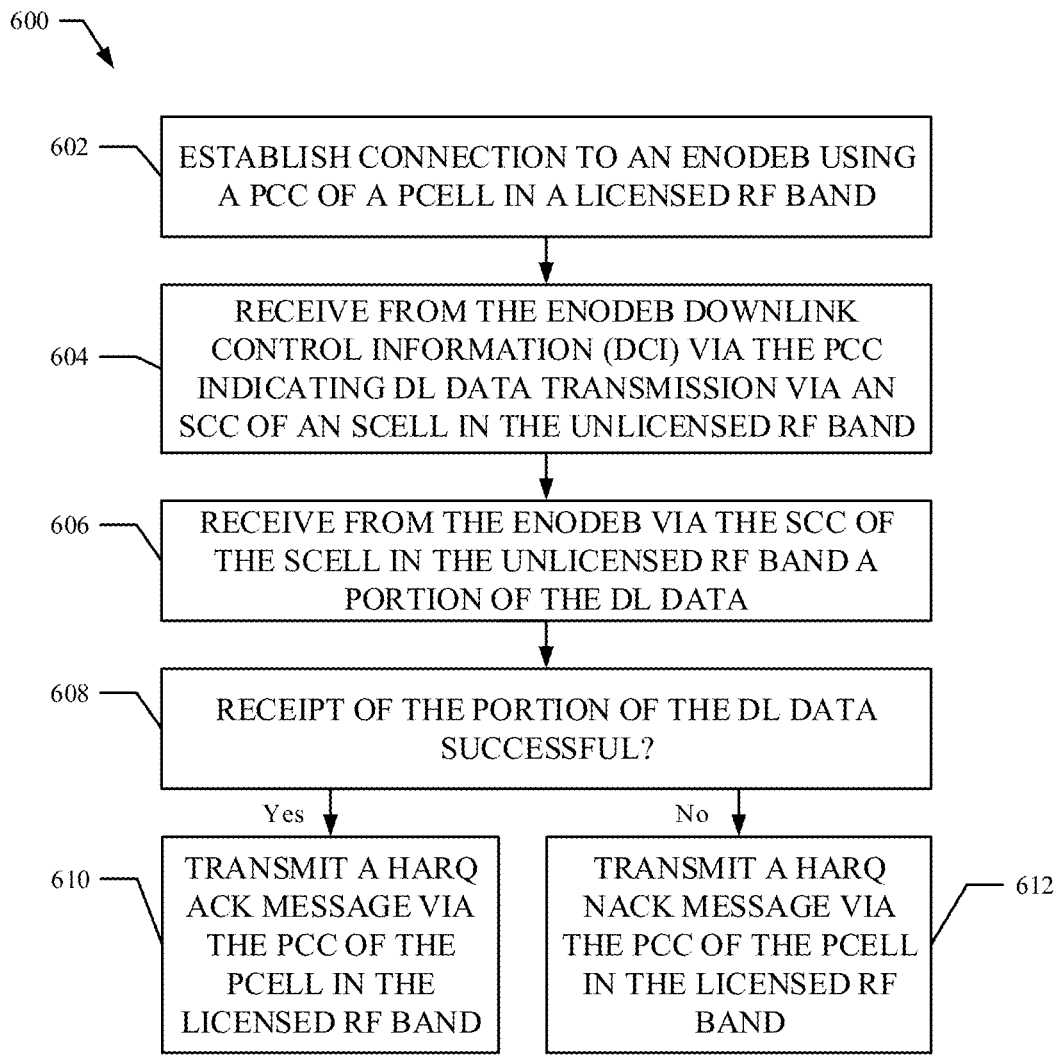
FIG. 6 illustrates a flowchart depicting a method for time division based communication by a wireless communication device in a licensed radio frequency (RF) band and an unlicensed RF band, in accordance with some embodiments.

FIG. 6 illustrates a flowchart 600 depicting a method for time division based communication by a wireless communication device, e.g., an LTE-U capable wireless communication device, in licensed and unlicensed radio frequency bands, in accordance with some embodiments. In step 602, an LTE-U capable wireless communication device establishes a connection with a wireless access network portion of a wireless network, e.g., with an eNodeB of a cellular wireless network, using a primary component carrier (PCC) of a primary cell (Pcell) in a licensed radio frequency (RF) band. In some embodiments, the connection includes a radio resource control (RRC) signaling connection between the LTE-U capable wireless communication device and the eNodeB to provide for control of one or more component carriers used for carrier aggregation. In step 604, the LTE-U capable wireless communication device receives from the eNodeB, via the PCC of the Pcell, downlink control information (DCI) indicating at least one forthcoming downlink (DL) data transmission via a secondary component carrier (SCC) of a secondary cell (Scell) in the unlicensed RF band. In step 606, the LTE-U capable wireless communication device receives from the eNodeB via the SCC of the Scell in the unlicensed RF band at least a portion of the DL data transmission. In step 608, the LTE-U capable wireless communication device determines whether the at least a portion of the DL data transmission received was successful. The LTE-U capable wireless communication device transmits a control message to the eNodeB via the PCC of the Pcell in the licensed RF band in response to receipt of the at least a portion of the DL data transmission. When receipt of the at least a portion of the DL data transmission is successful, the LTE-U capable wireless communication device transmits a hybrid automatic repeat request (HARQ) acknowledgement (ACK) message to the eNodeB via the PCC of the Pcell in the licensed RF band. When receipt of the at least a portion of the DL data transmission is not successful, the LTE-U capable wireless communication device transmits a HARQ negative acknowledgement (NACK) message to the eNodeB via the PCC of the Pcell in the licensed RF band. In some embodiments, the DCI received form the eNodeB further indicates at least one forthcoming DL data transmission via the PCC of the Pcell in the licensed RF band. In some embodiments, the LTE-U capable wireless communication device receives from the eNodeB via the PCC of the Pcell in the licensed RF band at least a second portion of the DL data transmission. In some embodiments, the LTE-U capable wireless communication device transmits a second control message, e.g., a HARQ ACK and/or NACK, via the PCC of the Pcell in the licensed RF band in response to receipt of the at least a second portion of the DL data transmission.

Figure 7:
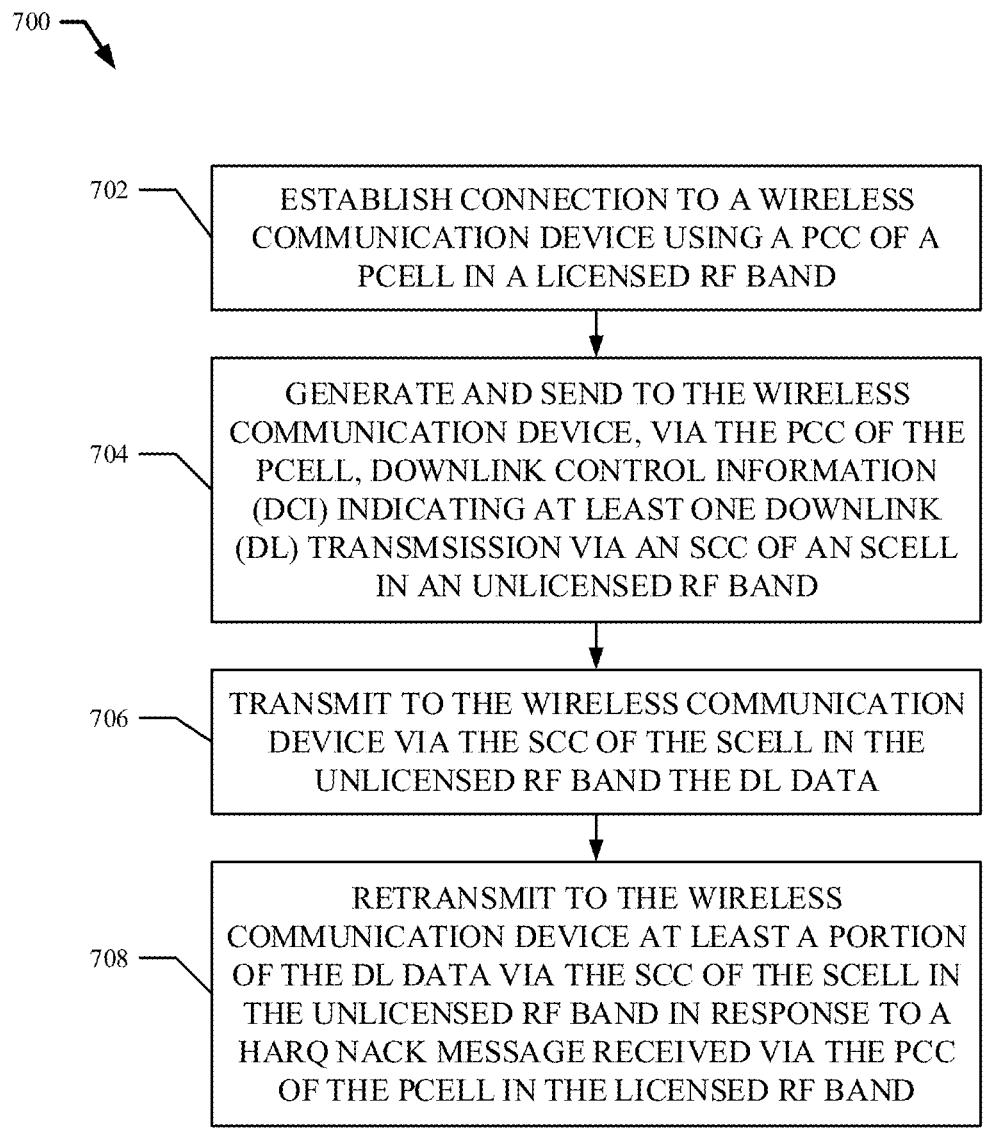
FIG. 7 illustrates a flowchart depicting a method for time division based communication by an eNodeB of a wireless network in a licensed radio frequency (RF) band and an unlicensed RF band, in accordance with some embodiments.

FIG. 7 illustrates a flowchart 700 depicting a method for time division based communication by an eNodeB in licensed and unlicensed radio frequency bands, in accordance with some embodiments. In step 702, the eNodeB establishes a connection to a wireless communication device, e.g., an LTE-U capable wireless communication device, using a PCC of a Pcell in a licensed RF band. In some embodiments, the connection includes a radio resource control (RRC) signaling connection between the LTE-U capable wireless communication device and the eNodeB to provide for control of one or more component carriers used for carrier aggregation. In step 704, the eNodeB generates and sends to the LTE-U capable wireless communication device, via the PCC of the Pcell, downlink control information (DCI) indicating at least one forthcoming downlink (DL) data transmission via an SCC of an Scell in the unlicensed RF band. In step 706, the eNodeB transmits to the LTE-U capable wireless communication device, via the SCC of the Scell in the unlicensed RF band, the DL data. In step 708, the eNodeB retransmits to the LTE-U capable wireless communication device, via the SCC of the Scell in the unlicensed RF band, at least a portion of the DL data in response to receipt via the PCC of the Pcell in the licensed RF band a HARQ NACK message indicating that receipt of the portion of the DL transmission was not successful. In some embodiments, the DCI also indicates at least one DL data transmission via the PCC of the Pcell in the licensed RF band (in addition to DL data transmission via the SCC of the Scell in the unlicensed RF band), and the eNodeB transmits to the LTE-U capable wireless communication device via the PCC of the Pcell in the unlicensed RF band at least a second portion of the DL data transmission.

Figure 8:
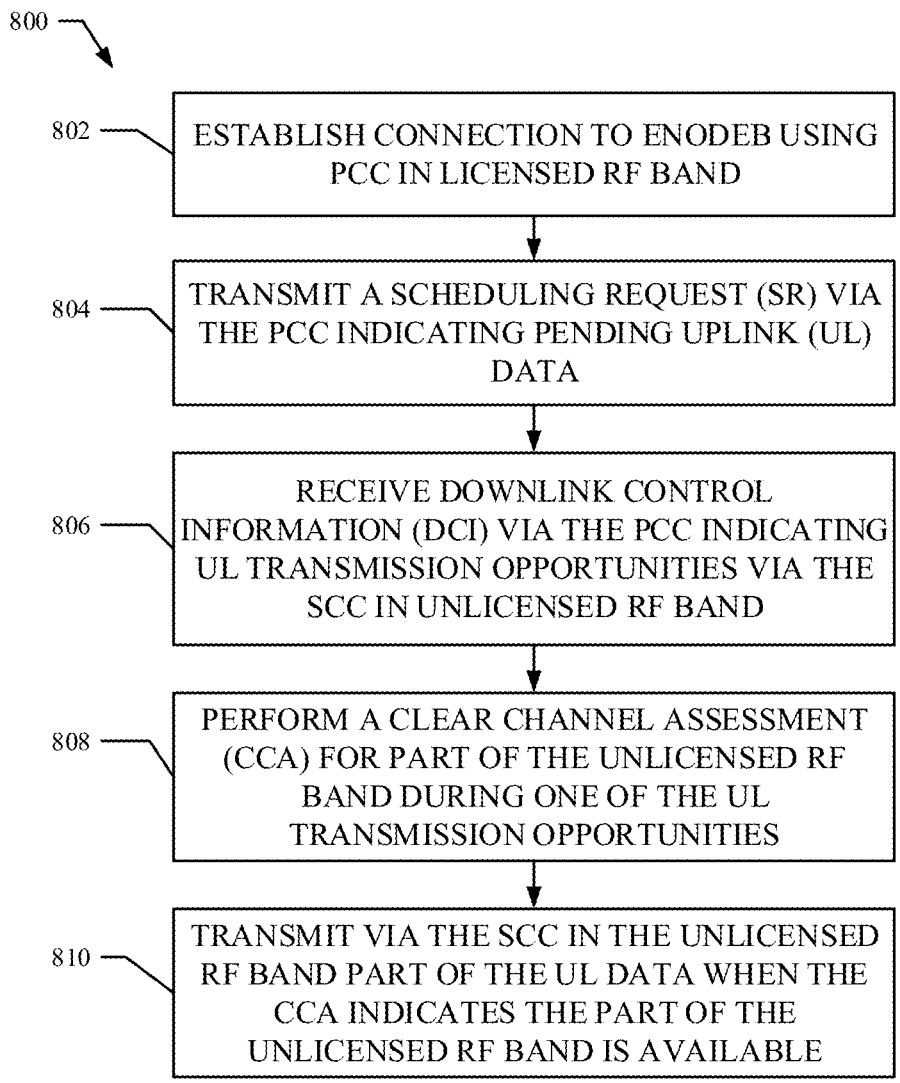
FIG. 8 illustrates a flowchart depicting another method for time division based communication by a wireless communication device in a licensed radio frequency (RF) band and an unlicensed RF band, in accordance with some embodiments.

FIG. 8 illustrates a flowchart 800 depicting another method for time division based communication by a wireless communication device, e.g., an LTE-U capable wireless communication device, in licensed and unlicensed radio frequency bands, in accordance with some embodiments. In step 802, the LTE-U capable wireless communication device establishes a connection to a wireless access network portion of a wireless network, e.g., to an eNodeB, using a PCC of a Pcell in a licensed RF band. In some embodiments, the connection includes a radio resource control (RRC) signaling connection between the LTE-U capable wireless communication device and the eNodeB to provide for control of one or more component carriers used for carrier aggregation. In step 804, the LTE-U capable wireless communication device transmits a scheduling request (SR) message via the PCC of the Pcell in the licensed RF band to the eNodeB. In some embodiments, the SR message indicates pending UL data available for transmission from the LTE-U capable wireless communication device to the eNodeB. In step 806, the LTE-U capable wireless communication device receives downlink control information (DCI) from the eNodeB via the PCC of the Pcell in the licensed RF band. In some embodiments, the DCI indicates one or more forthcoming UL transmission opportunities via an SCC of a Scell in the unlicensed RF band. In step 808, the LTE-U capable wireless communication device performs a clear channel assessment (CCA) for at least a portion of the unlicensed RF band during one of the UL transmission opportunities. In step 810, the LTE-U capable wireless communication device transmits to the eNodeB via the SCC of the Scell in the unlicensed RF band at least a portion of the pending UL data when the CCA indicates that the at least a portion of the unlicensed RF band is available for transmission. In some embodiments, the LTE-U capable wireless communication device repeats the CCA for the at least a portion of the unlicensed RF band during the one of the UL transmission opportunities after waiting for a back-off time period when the CCA initially indicates that the at least a portion of the unlicensed RF band is not available for transmission. In some embodiments, the LTE-U capable wireless communication device increases the back-off time period between each successive CCA attempt during the one of the UL transmission opportunities. In some embodiments, the LTE-U capable wireless communication device increases a time period for each successive CCA attempt up to a maximum length CCA time period threshold during the one of the UL transmission opportunities. In some embodiments, the DCI indicates multiple UL transmission opportunities via the SCC of the Scell in the unlicensed RF band. In some embodiments, the LTE-U capable wireless communication device repeats the CCA for the at least a portion of the unlicensed RF band during a second of the multiple forthcoming UL transmission opportunities when the unlicensed RF band is not available for transmission during the one (e.g., a first) of the UL transmission opportunities. In some embodiments, the LTE-U capable wireless communication device transmits to the eNodeB via the SCC of the Scell in the unlicensed RF band at least a portion of the pending UL data when the CCA indicates that the at least a portion of the unlicensed RF band is available for transmission during the second of the multiple UL transmission opportunities. In some embodiments, the DCI indicates a UL transmission opportunities via the PCC of the Pcell in the licensed RF band. In some embodiments, the LTE-U capable wireless communication device transmits to the eNodeB via the PCC of the Pcell in the licensed RF band at least part of the pending UL data during the UL transmission opportunity.

Figure 9:
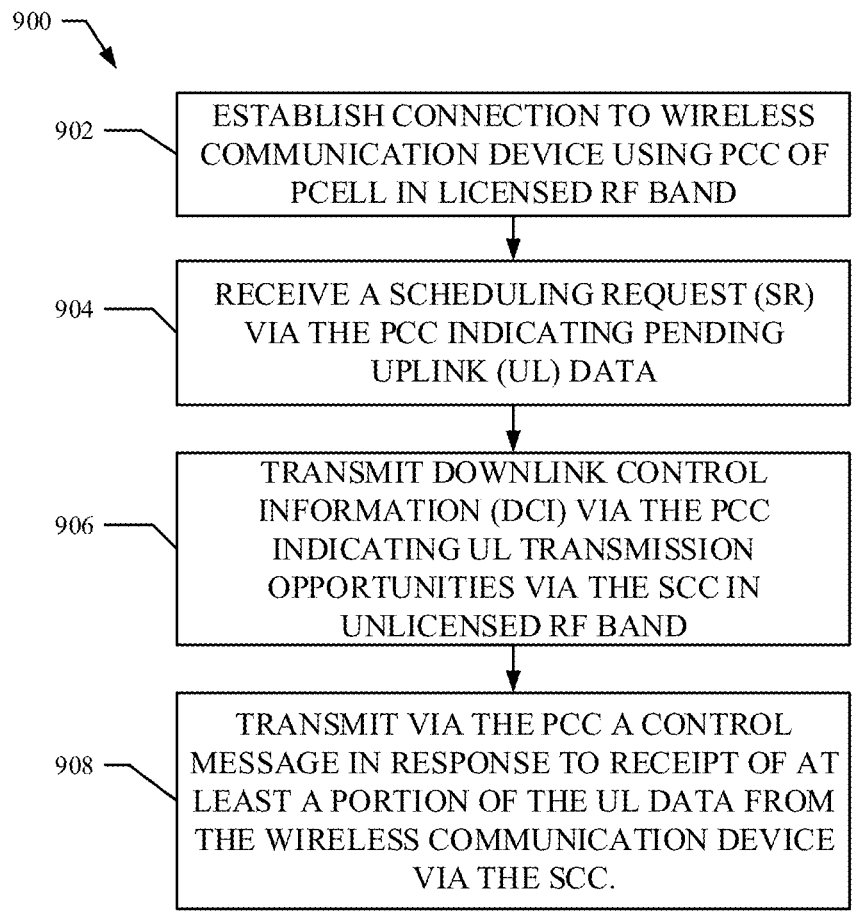
FIG. 9 illustrates a flowchart depicting another method for time division based communication by an eNodeB of a wireless network in a licensed radio frequency (RF) band and an unlicensed RF band, in accordance with some embodiments.

FIG. 9 illustrates a flowchart 900 depicting another method for time division based communication by a wireless access network portion of a wireless network, e.g., an eNodeB, in licensed and unlicensed RF bands, in accordance with some embodiments. In step 902, the eNodeB establishes a connection to a wireless communication device, e.g., an LTE-U capable wireless communication device, using a PCC of a Pcell in a licensed RF band. In some embodiments, the connection includes a radio resource control (RRC) signaling connection between the LTE-U capable wireless communication device and the eNodeB to provide for control of one or more component carriers used for carrier aggregation. In step 904, the eNodeB receives a scheduling request (SR) via the PCC of the Pcell in the licensed RF band, the SR message indicating pending UL data available for UL transmission to the eNodeB from the LTE-U wireless communication device. In step 906, the eNodeB transmits to the LTE-U capable wireless communication device downlink control information (DCI) indicating one or more UL transmission opportunities during which the eNodeB may be able to transmit UL data via an SCC of an Scell in an unlicensed RF band. In step 908, the eNodeB transmits to the LTE-U capable wireless communication device a control message via the PCC of the Pcell in the licensed RF band, in response to receipt of at least a portion of the UL data from the LTE-U capable wireless communication device via the SCC of the Scell in the unlicensed RF band. In some embodiments, the control message includes a HARQ ACK message when the eNodeB determines that receipt of the at least a portion of the UL data is successful. In some embodiments, the control message includes a HARQ NACK message when the eNodeB determines that receipt of the at least a portion of the UL data is not successful. In some embodiments, the DCI further indicates a UL transmission opportunity for the LTE-U capable wireless communication device during which to transmit part of the UL data via the PCC of the Pcell in the licensed RF band. In some embodiments, the eNodeB transmits via the PCC of the Pcell in the licensed RF band a second control message in response to receipt of at least a second portion of the UL data from the LTE-U capable wireless communication device via the PCC of the Pcell in the licensed RF band. In some embodiments, the second control message includes a HARQ ACK message, when the eNodeB determines that receipt of the second portion of the UL data is successful. In some embodiments, the second control message includes a HARQ NACK message, when the eNodeB determines that receipt of the second portion of the UL data is not successful.

Figure 10:
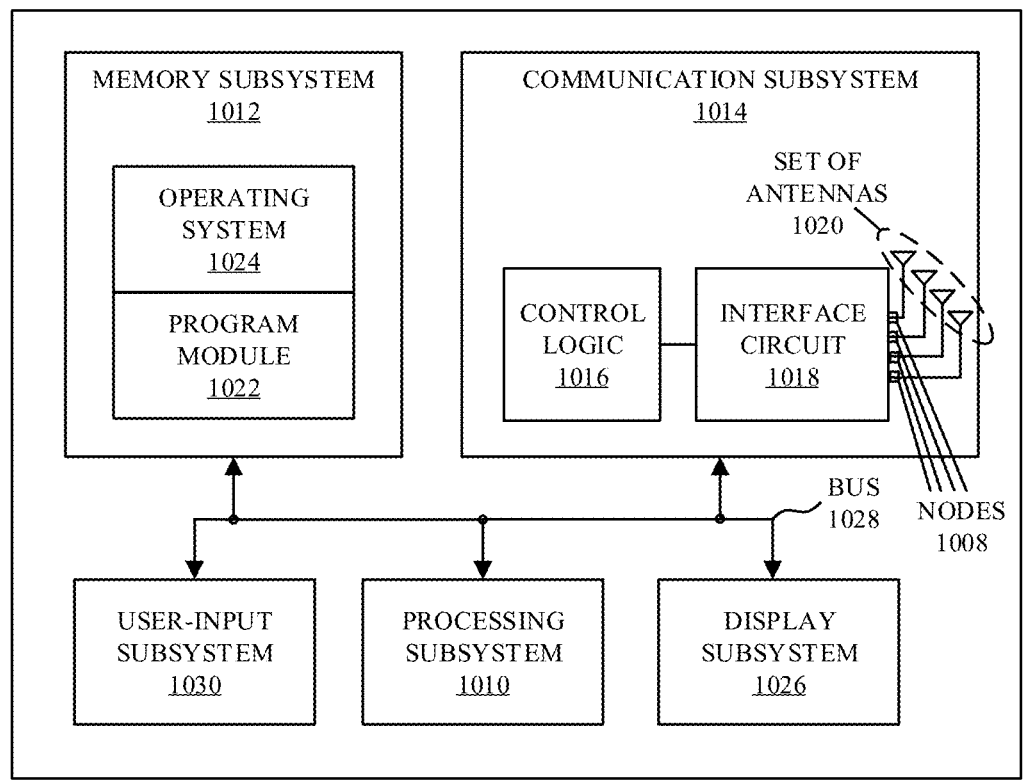
FIG. 10 illustrates a detailed view of an exemplary computing device that can be used to implement at least a portion of the various techniques described herein, in accordance with some embodiments.

FIG. 10 presents a block diagram of a representative electronic device 1000, which can be UE 106, in accordance with some embodiments. This electronic device 1000 includes processing subsystem 1010, memory subsystem 1012, and communication subsystem 1014. Processing subsystem 1010 includes one or more devices configured to perform computational operations. For example, processing subsystem 1010 can include one or more microprocessors, application-specific integrated circuits (ASICs), microcontrollers, programmable-logic devices, and/or one or more digital signal processors (DSPs). In some embodiments, processing subsystem 1010 can represent all or portions of processors 402, dual wireless manager module 406, and/or processing circuitry 410 of FIGS. 4A and 4B.

Memory subsystem 1012 includes one or more devices for storing data and/or instructions for processing subsystem 1010 and communication subsystem 1014. For example, memory subsystem 1012 can include dynamic random access memory (DRAM), static random access memory (SRAM), a read-only memory (ROM), flash memory, and/or other types of memory. In some embodiments, instructions for processing subsystem 1010 in memory subsystem 1012 include: one or more program modules or sets of instructions (such as program module 1022 or operating system 1024), which may be executed by processing subsystem 1010. For example, a ROM can store programs, utilities or processes to be executed in a non-volatile manner, and DRAM can provide volatile data storage, and may store instructions related to the operation of the electronic device. Note that the one or more computer programs may constitute a computer-program mechanism or software. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010. In some embodiments, the one or more programs are distributed over a network-coupled computer system so that the one or more computer programs are stored and executed in a distributed manner. In some embodiments, memory subsystem 1012 can represent all or portions of processing circuitry 410, dual wireless manager module 406, and/or memory 404 of FIGS. 4A and 4B.

In addition, memory subsystem 1012 can include mechanisms for controlling access to the memory. In some embodiments, memory subsystem 1012 includes a memory hierarchy that comprises one or more caches coupled to a memory in the electronic device. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by the electronic device as fast-access storage for often-used data, while the mass-storage device is used to store less frequently used data.

Communication subsystem 1014 includes one or more devices configured to couple to and communicate on a wired and/or wireless network (e.g., to perform network operations), including: control logic 1016, an interface circuit 1018 and a set of antennas 1020 (or antenna elements) in an adaptive array that can be selectively turned on and/or off by control logic 1016 to create a variety of optional antenna patterns or 'beam patterns.' (While FIG. 10 includes set of antennas 1020, in some embodiments the electronic device 1000 includes one or more nodes, such as nodes 1008, e.g., a pad, which can be coupled to set of antennas 1020. Thus, the electronic device 1000 may or may not include set of antennas 1020.) For example, communication subsystem 1014 can include a Bluetooth™ communication system, a cellular communication system (e.g., for communication with a 3G/4G network such as UMTS, LTE, etc.), a universal serial bus (USB) communication system, a communication system based on the standards described in IEEE 802.11 (e.g., a Wi-Fi® communication system), an Ethernet communication system, and/or another communication system.

Communication subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on a network for each communication system are sometimes collectively referred to as a 'network interface' for the communication system. Moreover, in some embodiments a 'network' or a 'connection' between the electronic devices does not yet exist. Therefore, the electronic device 1000 may use the mechanisms in communication subsystem 1014 for performing simple wireless communication between the electronic devices, e.g., transmitting advertising or beacon frames and/or scanning for advertising frames transmitted by other electronic devices. In some embodiments, communication subsystem 1014 can represent all or portions of cellular wireless subsystem 408, cellular baseband processor 414, WLAN wireless subsystem 412, and/or WLAN baseband processor 416 of FIGS. 4A and 4B.

Within the electronic device 1000, processing subsystem 1010, memory subsystem 1012, and communication subsystem 1014 are coupled together using bus 1028 that facilitates data transfer between these components. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, the electronic device 1000 includes a display subsystem 1026 for displaying information on a display, which may include a display driver and the display, such as a liquid-crystal display, a multi-touch touchscreen, etc. Display subsystem 1026 may be controlled by processing subsystem 1010 to display information to a user (e.g., information relating to incoming, outgoing, or an active communication session).

The electronic device 1000 can also include a user-input subsystem 1030 that allows a user of the electronic device 1000 to interact with the electronic device 1000. For example, user-input subsystem 1030 can take a variety of forms, such as: a button, keypad, dial, touch screen, audio input interface, visual/image capture input interface, input in the form of sensor data, etc.

The electronic device 1000 can be (or can be included in) any electronic device 1000 with at least one communication/network interface. For example, the electronic device 1000 may include: a cellular telephone or a smartphone, a tablet computer, a laptop computer, a notebook computer, a personal or desktop computer, a netbook computer, a media player device, an electronic book device, a MiFi® device, a smart watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1000, in alternative embodiments, different components and/or subsystems may be present in the electronic device 1000. For example, the electronic device 1000 may include one or more additional processing subsystems, memory subsystems, networking subsystems, and/or display subsystems. Additionally, one or more of the subsystems may not be present in the electronic device 1000. Moreover, in some embodiments, the electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in the electronic device 1000. For example, in some embodiments, program module 1022 is included in operating system 1024 and/or control logic 1016 is included in interface circuit 1018.

Moreover, the circuits and components in the electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of communication subsystem 1014. This integrated circuit may include hardware and/or software mechanisms that are used for transmitting wireless signals from the electronic device 1000 and receiving signals at the electronic device 1000 from other electronic devices. Aside from the mechanisms herein described, radios are generally known in the art and hence are not described in detail. In general, communication subsystem 1014 and/or the integrated circuit can include any number of radios. Note that the radios in multiple-radio embodiments function in a similar way to the described single-radio embodiments.

In some embodiments, communication subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises a trigger, providing a trigger response, etc.).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a wireless communication protocol as an illustrative example, in other embodiments a wide variety of communication protocols and, more generally, wireless and/or wired communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1022, operating system 1024 (such as a driver for interface circuit 1018) or in firmware in interface circuit 1018. Alternatively or additionally, at least some of the operations in the communication technique may be implemented in a physical layer, in a MAC layer, and/or in higher layers, such as implemented in a combination of hardware, software, and/or firmware in interface circuit 1018.

Figure 11:
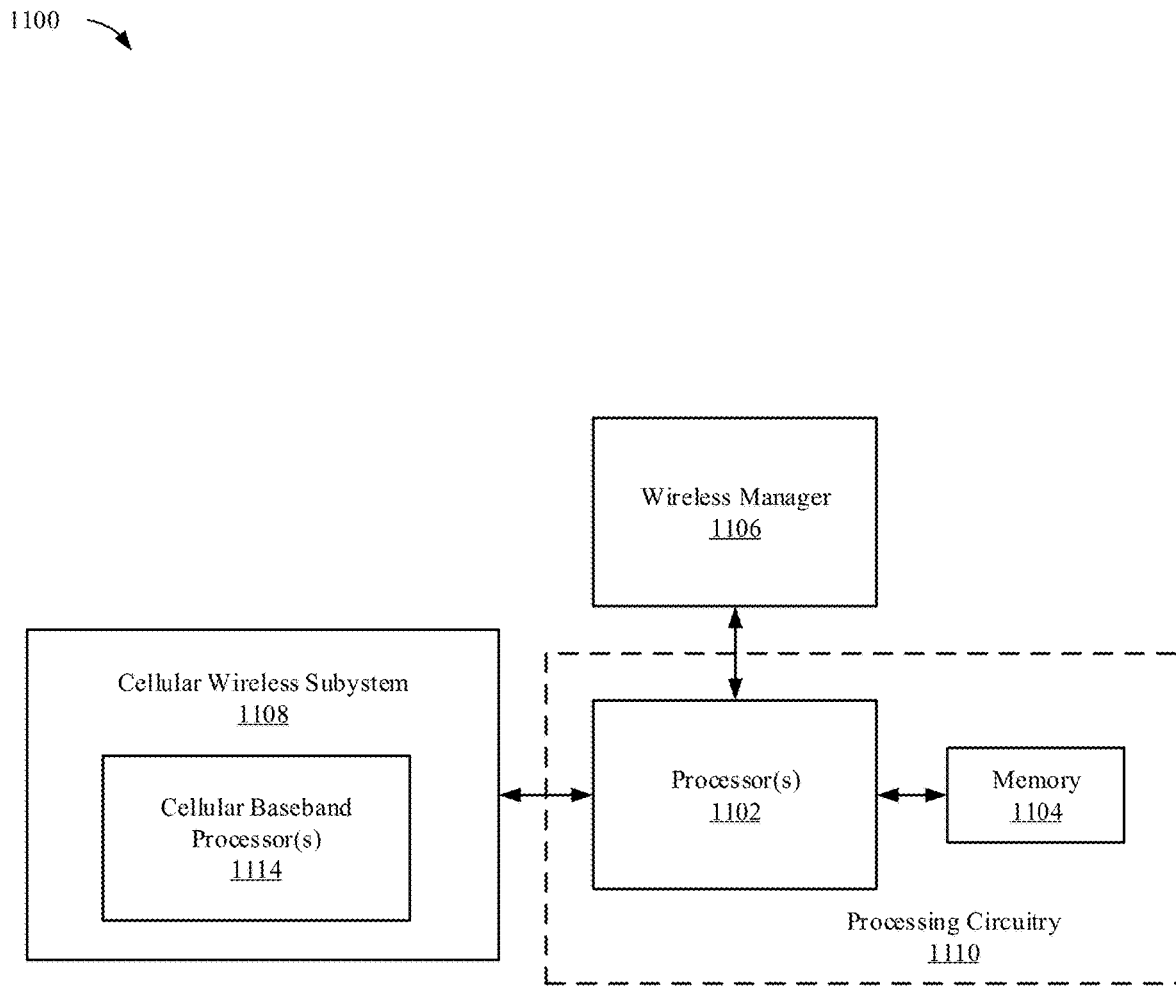
FIG. 11 illustrates a block diagram of a wireless network apparatus that can be implemented on an LTE-U capable wireless network apparatus, in accordance with some example embodiments.

FIG. 11 illustrates a block diagram of a wireless network apparatus 1100 that can be implemented on an LTE-U capable wireless network apparatus, in accordance with some example embodiments. It will be appreciated that the components, devices or elements illustrated in and described with respect to FIG. 11 may not be mandatory and thus some may be omitted in certain embodiments. Additionally, some embodiments can include further or different components, devices or elements beyond those illustrated in and described with respect to FIG. 11. Further, it will be appreciated that, in some example embodiments, one or more components of the wireless network apparatus 1100 can be distributed across a plurality of computing devices that can collectively provide the functionality of an LTE-U capable wireless network apparatus to operate using multiple radio frequency bands, including carrier aggregation via a primary component carrier in a Pcell licensed radio frequency band and a secondary component carrier in an Scell unlicensed radio frequency band. The wireless network apparatus 1100 can provide for management of communication in licensed and unlicensed radio frequency bands simultaneously. The wireless network apparatus 1100, in some embodiments, can further provide for time sharing of radio frequency channels (and/or radio frequency bandwidth) in an unlicensed radio frequency band for (i) communication between an LTE-U capable wireless network apparatus and an LTE-U capable wireless communication device and (ii) wireless communication by other "non-cellular" wireless communication devices configured to share at least a portion of the same unlicensed radio frequency band. In some embodiments, the wireless network apparatus 1100 includes access network equipment, such as an eNodeB, base station, or equivalent network equipment configurable to perform methods as described herein.

In some example embodiments, the wireless network apparatus 1100 can include processing circuitry 1110 that is configurable to perform actions in accordance with one or more example embodiments disclosed herein. In this regard, the processing circuitry 1110 can be configured to perform and/or control performance of one or more functionalities of the wireless network apparatus 1100 in accordance with various example embodiments, and thus can provide means for performing functionalities of the wireless network apparatus 1100 in accordance with various example embodiments. The processing circuitry 1110 can be configured to perform data processing, application execution and/or other processing and management services according to one or more example embodiments.

In some embodiments, the wireless network apparatus 1100 or a portion(s) or component(s) thereof, such as the processing circuitry 1110, can include one or more chipsets, which each can include one or more chips. The processing circuitry 1110 and/or one or more further components of the wireless network apparatus 1100 can therefore, in some instances, be configured to implement an embodiment on a chipset comprising one or more chips. In some example embodiments in which one or more components of the wireless network apparatus 1100 are embodied as a chipset, the chipset can be capable of enabling a computing device(s) to operate as an LTE-U capable wireless network apparatus, operating using radio frequency channels in an unlicensed radio frequency band together with radio frequency channels in a licensed radio frequency band using carrier aggregation across the licensed and unlicensed radio frequency bands, when implemented on or otherwise operably coupled to the computing device(s). In some embodiments, the processing circuitry 1110 can include one or more processors 1102 and, in some embodiments, such as that illustrated in FIG. 11, can further include memory 1104. The processing circuitry 1110 can be in communication with or otherwise control one or more wireless subsystems, including a cellular wireless subsystem 1108, which can include one or more cellular baseband processors 1114, the wireless cellular subsystem configurable for communication using radio frequency channels in a licensed radio frequency band and/or in an unlicensed radio frequency band, e.g., using a primary component carrier (PCC) for communication in a licensed radio frequency band and a secondary component carrier (SCC) for communication in an unlicensed radio frequency band, where the PCC and SCC communicated with an LTE-U capable wireless communication device. The processing circuitry 1110 can be also in communication with a wireless manager module 1106, which can provide rules and/or actions to manage connections using the cellular wireless subsystem 1108.

The one or more processors 1102 can be embodied in a variety of forms. For example, the one or more processors 1102 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 402 can comprise a plurality of processors. The plurality of processors can be in operative communication with each other and can be collectively configured to perform one or more functionalities of the wireless network apparatus 1100 as described herein. In embodiments including a plurality of processors, the plurality of processors can be implemented on a single computing device, or can be distributed across a plurality of computing devices that can collectively provide functionality of an LTE-U capable wireless communication device. In some example embodiments, the one or more processors 1102 can be configured to execute instructions that can be stored in the memory 1104 or that can be otherwise accessible to the one or more processors 1102. As such, whether configured by hardware or by a combination of hardware and software, the one or more processors 1102 can be capable of performing operations according to various embodiments while configured accordingly.

In some example embodiments, the memory 1104 can include one or more memory devices. Memory 1104 can include fixed and/or removable memory devices. In some embodiments, the memory 1104 can provide a non-transitory computer-readable storage medium that can store computer program instructions that can be executed by the one or more processors 1102. In this regard, the memory 1104 can be configured to store information, data, applications, instructions and/or the like for enabling the wireless network apparatus 1100 to carry out various functions in accordance with one or more example embodiments. In embodiments including a plurality of memory devices, the plurality of memory devices can be implemented on a single computing device, or can be distributed across a plurality of computing devices that can collectively provide functionality of an LTE-U capable wireless network apparatus. In some embodiments, the memory 1104 can be in communication with one or more of the one or more processors 1102, the wireless manager module 1106, and/or the cellular wireless subsystem 1108 via one or more busses for passing information among components of the wireless network apparatus 1100.

The wireless network apparatus 1100 can further include one or more wireless subsystems, e.g., the cellular wireless subsystem 1108. The cellular wireless subsystem 1108 can include one or more mechanisms for enabling communication between the wireless network apparatus 1100 and wireless communication devices, e.g., LTE-U capable wireless communication devices. The wireless network apparatus 1100 can include multiple wireless subsystems, which can each provide communication in accordance with a wireless communication protocol. In some embodiments, the multiple wireless subsystems of the wireless network apparatus 1100 can communicate with each other directly via a communication path (not shown) or indirectly through communication with the processing circuitry 1110.

The wireless network apparatus 1100 can further include a wireless manager module 1106. The wireless manager module 1106 can be embodied as various means, such as circuitry, hardware, a computer program product comprising computer readable program instructions stored on a non-transitory computer readable medium (for example, the memory 1104) and executed by a processing device (for example, the one or more processors 1102), or some combination thereof. In some embodiments, the one or more processors 1102 (or the processing circuitry 1110) can include, or otherwise control the wireless manager module 1106. The wireless manager module 1106 can be configured to support wireless communication using multiple wireless communication protocols and/or using a wireless communication protocol that supports communication using multiple radio frequency bands, including but not limited to communication using a licensed radio frequency band channel and an unlicensed radio frequency band channel together via carrier aggregation. The wireless manager module 1106 can also be configured to provide management of communication using multiple wireless subsystems, e.g., the cellular wireless subsystem 1108, to mitigate coexistence interference for communication with LTE-U capable wireless communication devices in an unlicensed radio frequency band.

In the preceding description, we refer to 'some embodiments.' Note that 'some embodiments' describes a subset of all of the possible embodiments, but does not always specify the same subset of embodiments.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for communication in an unlicensed radio frequency (RF) band, the method comprising:
   by a wireless network apparatus of a wireless network:
   receiving, from a wireless communication device via a primary component carrier (PCC) in a licensed RF band, a scheduling request (SR) message indicating pending uplink (UL) data;
   transmitting, to the wireless communication device via the PCC in the licensed RF band, a physical downlink control channel (PDCCH) downlink control information (DCI) extended format message that includes an enhanced UL grant indicating a plurality of distinct UL transmission opportunities that provide multiple distinct time periods for the wireless communication device to communicate UL data via a secondary component carrier (SCC) in the unlicensed RF band; and transmitting, to the wireless communication device via the PCC in the licensed RF band after all of the plurality of distinct UL transmission opportunities have occurred, a control message comprising a bundled set of hybrid automatic repeat request (HARD) acknowledgement (ACK) and negative acknowledgement (NACK) messages corresponding to the plurality of distinct UL transmission opportunities, wherein:
the PCC and SCC use identical time division duplex (TDD) Long Term Evolution (LTE) uplink/downlink (UL/DL) subframe configurations, and the wireless communication device is configured to use a clear channel access (CCA) mechanism before each distinct UL transmission opportunity to determine whether portions of unlicensed RF band are available for transmission by the wireless communication device.

2. The method of claim 1, wherein the control message comprises:
a HARQ ACK message, when the wireless network apparatus determines that receipt of at least a portion of the UL data is successful, or
a HARQ NACK message, when the wireless network apparatus determines that receipt of at least a portion of the UL data is not successful.

3. The method of claim 1, wherein wireless network apparatus of the wireless network is limited to continuous transmissions of no more than five milliseconds in the unlicensed RF band.

4. The method of claim 1, wherein the PDCCH DCI extended format message further indicates a UL transmission opportunity via the PCC in the licensed RF band.

5. The method of claim 4, further comprising:
by a wireless network apparatus of a wireless network:
transmitting, to the wireless communication device via the PCC in the licensed RF band, a second control message, in response to receipt of at least a second portion of the UL data from the wireless communication device via the PCC in the licensed RF band.

6. The method of claim 5, wherein the second control message comprises:
a HARQ ACK message, when the wireless network apparatus determines that receipt of the second portion of the UL data is successful, or
a HARQ NACK message, when the wireless network apparatus determines that receipt of the second portion of the UL data is not successful.

7. The method of claim 5, wherein the PDCCH DCI extended format message limits the wireless communication device to continuous transmissions of no more than five milliseconds in the unlicensed RF band for each distinct UL transmission opportunity.

8. A method for communication in an unlicensed radio frequency (RF) band, the method comprising:
by a wireless communication device:
transmitting, to an eNodeB of a wireless network via a primary component carrier (PCC) in a licensed RF band, a scheduling request (SR) message indicating pending uplink (UL) data;
receiving, from the eNodeB via the PCC in the licensed RF band, a physical downlink control channel (PDCCH) downlink control information (DCI) extended format message that includes an enhanced UL grant indicating a plurality of distinct UL transmission opportunities that provide multiple distinct time periods for the wireless communication device to communicate UL data via a secondary component carrier (SCC) in the unlicensed RF band;

performing a clear channel assessment (CCA) for at least a portion of the unlicensed RF band during a first one of the plurality of distinct UL transmission opportunities;

transmitting, to the eNodeB via the SCC in the unlicensed RF band, at least a portion of the pending UL data, when the CCA indicates that the at least a portion of the unlicensed RF band is available for transmission during the first one of the plurality of distinct UL transmission opportunities;

repeating the CCA for the at least a portion of the unlicensed RF band during a second one of the plurality of distinct UL transmission opportunities after waiting for a back-off time period, when the CCA indicates that the at least a portion of the unlicensed RF band is not available for transmission during the one of the plurality of distinct UL transmission opportunities; and transmitting, to the eNodeB via the SCC in the unlicensed RF band, at least a portion of the pending UL data, when the CCA indicates that the at least a portion of the unlicensed RF band is available for transmission during the second one of the plurality of distinct UL transmission opportunities, wherein the PCC and SCC use identical time division duplex (TDD) Long Term Evolution (LTE) uplink/downlink (UL/DL) subframe configurations.

9. The method of claim 8, further comprising:
by the wireless communication device:
increasing the back-off time period between each successive CCA attempted during the first one of the plurality of UL transmission opportunities.

10. The method of claim 8, further comprising:
by the wireless communication device:
increasing a time period for each successive CCA attempted up to a maximum length CCA time period threshold during the first one of the plurality of UL transmissions opportunities.

11. The method of claim 8, further comprising:
by the wireless communication device:
transmitting, to the eNodeB via the SCC in the unlicensed RF band, a preamble with the at least a portion of the pending UL data, when the CCA indicates that the at least a portion of the unlicensed RF band is available for transmission.

12. The method of claim 11, wherein the preamble precedes the at least a portion of the pending UL data.

13. The method of claim 11, wherein the preamble is transmitted as part of the at least a portion of the pending UL data.

14. The method of claim 11, wherein the wireless communication device transmits the preamble to reserve the at least a portion of the unlicensed RF band for transmission of the at least a portion of the pending UL data.

15. The method of claim 11, wherein the wireless communication device transmits the preamble to the eNodeB to assist the eNodeB to perform at least one of time synchronization and frequency synchronization.

16. The method of claim 8, wherein the PDCCH DCI extended format message further indicates at least one additional UL transmission opportunity via the PCC in the licensed RF band and the method further comprises:
by the wireless communication device:
transmitting, to the eNodeB via the PCC in the licensed RF band, at least part of the pending UL data during the at least one additional UL transmission opportunity.

17. The method of claim 8, further comprising:
by the wireless communication device:
determining an UL transmission failure, when all CCAs attempted during the plurality of distinct UL transmission opportunities indicate that the at least a portion of the unlicensed RF band is not available for transmission.

18. The method of claim 8, further comprising:
by the wireless communication device:
receiving, from the eNodeB via the PCC in the licensed RF band, a control message comprising a bundled set of hybrid automatic repeat request (HARD) acknowledgement (ACK) and negative acknowledgement (NACK) messages corresponding to the plurality of distinct UL transmission opportunities after all of the plurality of distinct UL transmission opportunities have occurred.

19. An apparatus configurable for operation in a wireless communication device, the apparatus comprising:
processing circuitry including a processor and a memory storing instructions that, when executed by the processor, cause the wireless communication device to:
transmit, to an eNodeB of a wireless network via a primary component carrier (PCC) in a licensed radio frequency (RF) band, a scheduling request (SR) message indicating pending uplink (UL) data;
receive, from the eNodeB via the PCC in the licensed RF band, a physical downlink control channel (PDCCH) downlink control information (DCI) extended format message that includes an enhanced UL grant indicating a plurality of distinct UL transmission opportunities that provide multiple distinct time periods for the wireless communication device to communicate UL data via a secondary component carrier (SCC) in an unlicensed RF band;
perform a clear channel assessment (CCA) for at least a portion of the unlicensed RF band during a first one of the plurality of distinct UL transmission opportunities;
transmit, to the eNodeB via the SCC in the unlicensed RF band, at least a portion of the pending UL data, when the CCA indicates that the at least a portion of the unlicensed RF band is available for transmission during the first one of the plurality of distinct UL transmission opportunities;
repeat the CCA for the at least a portion of the unlicensed RF band during a second one of the plurality of distinct UL transmission opportunities after waiting for a back-off time period, when the CCA indicates that the at least a portion of the unlicensed RF band is not available for transmission during the one of the plurality of distinct UL transmission opportunities; and
transmit, to the eNodeB via the SCC in the unlicensed RF band, at least a portion of the pending UL data, when the CCA indicates that the at least a portion of the unlicensed RF band is available for transmission during the second one of the plurality of distinct UL transmission opportunities,
wherein the PCC and SCC use identical time division duplex (TDD) Long Term Evolution (LTE) uplink/downlink (UL/DL) subframe configurations.

20. The apparatus of claim 19, wherein execution of the instructions further causes the wireless communication device to:
receive, from the eNodeB via the PCC in the licensed RF band, a control message comprising a bundled set of hybrid automatic repeat request (HARQ) acknowledgement (ACK) and negative acknowledgement (NACK) messages corresponding to the plurality of distinct UL transmission opportunities after all of the plurality of distinct UL transmission opportunities have occurred.

* * * * *

UNITED STATES PATENT AND TRADEMARK OFFICE
CERTIFICATE OF CORRECTION

PATENT NO. : 11,115,997 B2
APPLICATION NO. : 16/272596
DATED : September 7, 2021
INVENTOR(S) : Farouk Belghoul et al.

Page 1 of 1

It is certified that error appears in the above-identified patent and that said Letters Patent is hereby corrected as shown below:

In the Specification

At Column 10, Line 10: "ber of mobility management entities (MMES) 108a-c, serv-" should read -- ber of mobility management entities (MMEs) 108a c, serv- --.

In the Claims

In Claim 1, at Column 41, Line 9: "(HARD) acknowledgement (ACK) and negative" should read -- (HARQ) acknowledgement (ACK) and negative --.

In Claim 18, at Column 43, Line 19: "of hybrid automatic repeat request (HARD)" should read -- of hybrid automatic repeat request (HARQ) --.

Signed and Sealed this
Twenty-eighth Day of February, 2023

Katherine Kelly Vidal
*Director of the United States Patent and Trademark Office*